US012659952B2

(12) United States Patent
Khoshnevisan et al.

(10) Patent No.: US 12,659,952 B2

(45) Date of Patent: Jun. 16, 2026

(54) FEEDBACK CODEBOOK SIZE BASED ON CONTROL CHANNEL MONITORING OCCASIONS

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 453 days.

(21) Appl. No.: 18/309,258

(22) Filed: Apr. 28, 2023

(65) Prior Publication Data

US 2024/0365318 A1      Oct. 31, 2024

(51) Int. Cl.
H04W 72/1273          (2023.01)
H04W 72/23          (2023.01)

(52) U.S. Cl.
CPC ....... *H04W 72/1273* (2013.01); *H04W 72/23* (2023.01)

(58) Field of Classification Search
CPC .......................... H04W 72/23; H04W 72/1273
USPC ......................................................... 370/329
See application file for complete search history.

(56) References Cited

U.S. PATENT DOCUMENTS

| | | | |
|---|---|---|---|
| 12,349,114 B2 * | 7/2025 | Li | ........................... H04L 5/0044 |
| 2023/0239082 A1 * | 7/2023 | Choi | ....................... H04L 1/1896 |

| | | | |
|---|---|---|---|
| 2024/0048295 A1 * | 2/2024 | Choi | ...................... H04L 1/1614 |
| 2024/0163894 A1 * | 5/2024 | Xiong | ................... H04L 1/1854 |
| 2024/0365319 A1 * | 10/2024 | Khoshnevisan | .. H04W 72/1273 |

FOREIGN PATENT DOCUMENTS

| | | |
|---|---|---|
| EP | 4319004 A1 | 2/2024 |
| WO | 2022065963 A1 | 3/2022 |
| WO | 2022211557 A1 | 10/2022 |

OTHER PUBLICATIONS

Partial International Search Report—PCT/US2024/018077—ISA/EPO—Jul. 25, 2024 (2302363WO).
International Search Report and Written Opinion—PCT/US2024/018077—ISA/EPO—Aug. 16, 2024 (2302363WO).

* cited by examiner

*Primary Examiner* — Peter G Solinsky

(74) *Attorney, Agent, or Firm* — Holland & Hart LLP

(57)          ABSTRACT

Methods, systems, and devices for wireless communications are described. The described techniques provide for a user equipment (UE) transmitting feedback according to a codebook size, where the codebook size is determined according to a quantity of physical downlink control channel (PDCCH) monitoring occasions (PMOs) that occur before a feedback slot for transmitting the codebook. The UE may generate feedback according to a codebook that includes an entry corresponding to each PMO, which may indicate the feedback associated with the corresponding PMO. For example, if the UE receives a downlink control information (DCI) message during a PMO, the UE may set a corresponding feedback bit according to a decoding result of a transmission scheduled by the DCI.

21 Claims, 15 Drawing Sheets

130

105

115

Network
Entity

Transceiver

1410

Antenna

1415

Communications
Manager

Memory

Code

1430

1425

1420

Processor

1440

1435

1405

1400

Figure 15:
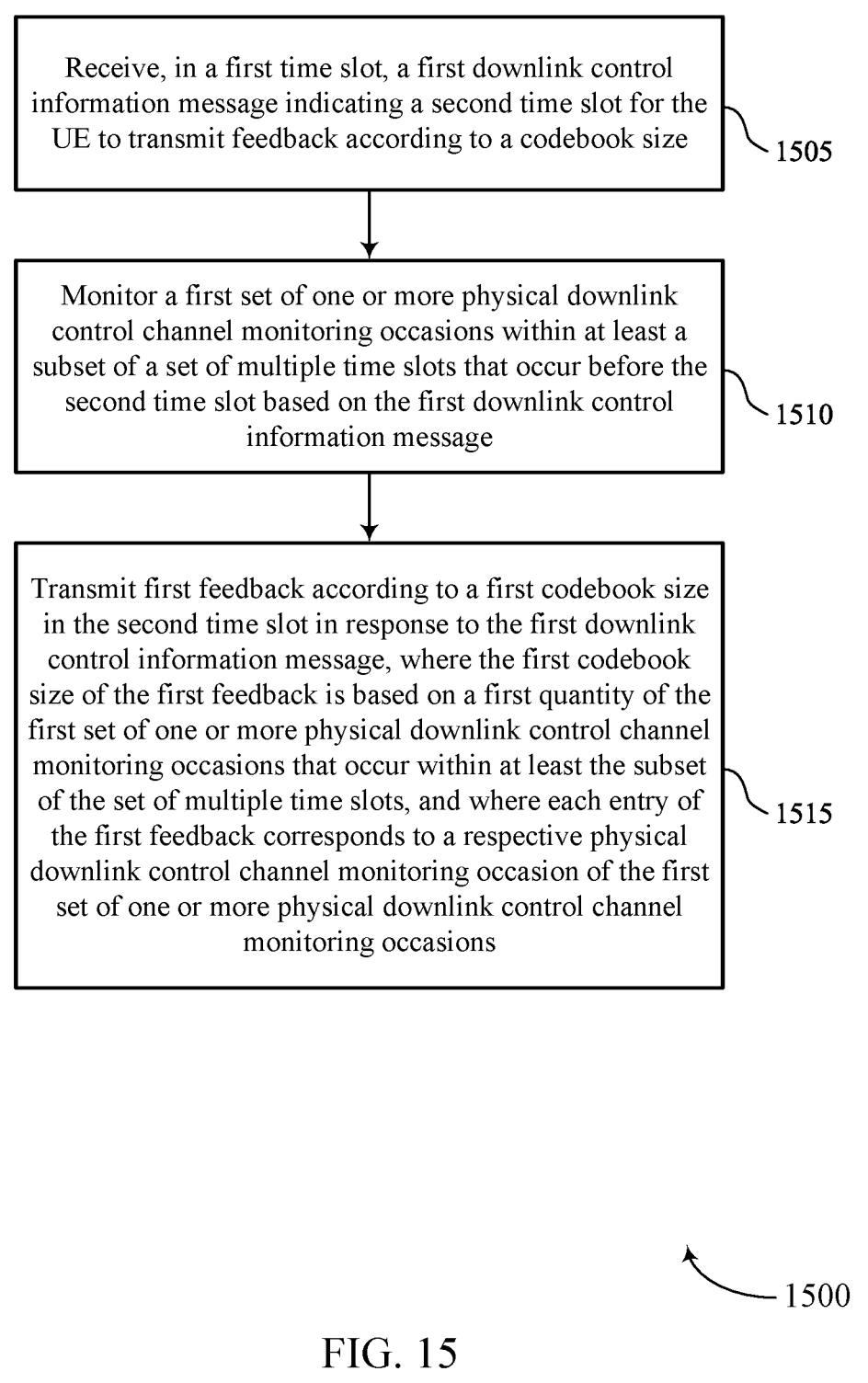

Receive, in a first time slot, a first downlink control information message indicating a second time slot for the UE to transmit feedback according to a codebook size

1505

Monitor a first set of one or more physical downlink control channel monitoring occasions within at least a subset of a set of multiple time slots that occur before the second time slot based on the first downlink control information message

1510

Transmit first feedback according to a first codebook size in the second time slot in response to the first downlink control information message, where the first codebook size of the first feedback is based on a first quantity of the first set of one or more physical downlink control channel monitoring occasions that occur within at least the subset of the set of multiple time slots, and where each entry of the first feedback corresponds to a respective physical downlink control channel monitoring occasion of the first set of one or more physical downlink control channel monitoring occasions

FEEDBACK CODEBOOK SIZE BASED ON CONTROL CHANNEL MONITORING OCCASIONS

FIELD OF TECHNOLOGY

The following relates to wireless communications, including a feedback codebook size based on control channel monitoring occasions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a network entity may schedule transmission of one or more messages to UE, and the UE may report feedback to the network entity indicating whether the messages were successfully received. However, conventional feedback reporting schemes are deficient.

SUMMARY

The described techniques relate to improved methods, systems, devices, and apparatuses that support a feedback codebook size based on control channel monitoring occasions. For example, the described techniques provide for a user equipment (UE) to receive a downlink control information (DCI) message allocating resources for a data transmission, for feedback reporting by the UE, or both. For example, the DCI message may indicate a time slot for the UE to indicate feedback for one or more downlink signals. In some cases, the UE may communicate feedback according to a codebook, where the codebook may be sized according to a quantity of physical downlink control channel (PDCCH) monitoring occasions (PMOs) that occur before a feedback slot for transmitting the codebook. The UE may monitor one or more PMOs during a set of one or more candidate slots. In some cases, the UE may generate feedback according to a codebook that includes an entry (e.g., one or more bits) corresponding to each PMO, which may indicate the feedback associated with the corresponding PMO. For example, if the UE receives, during a first PMO, a DCI message that schedules a physical downlink shared channel (PDSCH) transmission, the UE may set a corresponding feedback bit (e.g., a first entry of the codebook corresponding to the first PMO) according to a decoding result of the PDSCH transmission (e.g., an acknowledgement (ACK) or a negative acknowledgement (NACK)). As another example, such as when the UE does not detect a DCI during a PMO, the UE may set a feedback bit corresponding to the PMO to a NACK. In some examples, such techniques may be extended to support reporting feedback for multi-bit codebook entries (e.g., such as when a DCI is capable of scheduling multiple PDSCH transmissions, a PDSCH transmission is associated with multiple transport blocks (TBs), or the like).

A method for wireless communications at a UE is described. The method may include receiving, in a first time slot, a first DCI message indicating a second time slot for the UE to transmit feedback according to a codebook size, monitoring a first set of one or more PMOs within at least a subset of a set of multiple time slots that occur before the second time slot based on the first DCI message, and transmitting first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

An apparatus for wireless communications at a UE is described. The apparatus may include a processor, memory coupled with the processor, and instructions stored in the memory. The instructions may be executable by the processor to cause the apparatus to receive, in a first time slot, a first DCI message indicating a second time slot for the UE to transmit feedback according to a codebook size, monitor a first set of one or more PMOs within at least a subset of a set of multiple time slots that occur before the second time slot based on the first DCI message, and transmit first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

Another apparatus for wireless communications at a UE is described. The apparatus may include means for receiving, in a first time slot, a first DCI message indicating a second time slot for the UE to transmit feedback according to a codebook size, means for monitoring a first set of one or more PMOs within at least a subset of a set of multiple time slots that occur before the second time slot based on the first DCI message, and means for transmitting first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

A non-transitory computer-readable medium storing code for wireless communications at a UE is described. The code may include instructions executable by a processor to receive, in a first time slot, a first DCI message indicating a second time slot for the UE to transmit feedback according to a codebook size, monitor a first set of one or more PMOs within at least a subset of a set of multiple time slots that occur before the second time slot based on the first DCI message, and transmit first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

In some examples of the method, apparatuses, and non-transitory computer-readable medium described herein, monitoring the first set of one or more PMOs may include operations, features, means, or instructions for receiving, during a first PMO of the first set of one or more PMOs, a second DCI message that schedules a PDSCH transmission, where a first entry of the first feedback indicates an ACK or a NACK according to a decoding result of the PDSCH transmission, the first entry corresponding to the first PMO.

In some examples of the method, apparatuses, and non-transitory computer-readable medium described herein, monitoring the first set of one or more PMOs may include operations, features, means, or instructions for receiving, during a first PMO of the first set of one or more PMOs, a second DCI message, where a first entry of the first feedback indicates an ACK based on the second DCI message not scheduling a data transmission, the first entry corresponding to the first PMO.

In some examples of the method, apparatuses, and non-transitory computer-readable medium described herein, a first entry of the first feedback indicates a NACK based on not receiving control information during a first PMO of the first set of PMOs, the first entry corresponding to the first PMO.

In some examples of the method, apparatuses, and non-transitory computer-readable medium described herein, each PMO of the first set of one or more PMOs does not overlap with a semi-static uplink symbol in a time domain duplexing (TDD) pattern.

In some examples of the method, apparatuses, and non-transitory computer-readable medium described herein, each PMO of the first set of one or more PMOs may be associated with a DCI format associated with feedback transmission.

Some examples of the method, apparatuses, and non-transitory computer-readable medium described herein may further include operations, features, means, or instructions for transmitting a capability report indicating a capability of the UE to use a first type of feedback codebook that may have the first codebook size that corresponds to a quantity of PMOs, where the first feedback may be in accordance with the first type of feedback codebook and receiving, based on transmitting the capability report, radio resource control (RRC) signaling indicating a configuration for the first type of feedback codebook, where the configuration may be associated with a cell group of the UE, a component carrier (CC) of the UE, or both.

Some examples of the method, apparatuses, and non-transitory computer-readable medium described herein may further include operations, features, means, or instructions for receiving control information indicating a first set of slot offset values and a second set of slot offset values, where the subset of the set of multiple time slots may be based on the first set of slot offset values and the second set of slot offset values.

Some examples of the method, apparatuses, and non-transitory computer-readable medium described herein may further include operations, features, means, or instructions for receiving an indication of a set of multiple slot offset values, where the first set of one or more PMOs within at least the subset of the set of multiple time slots that occur before the second time slot may be based on the set of multiple slot offset values.

Some examples of the method, apparatuses, and non-transitory computer-readable medium described herein may further include operations, features, means, or instructions for receiving, during a first PMO of the first set of one or more PMOs, a second DCI message that schedules a physical downlink control channel transmission and indicates a first slot offset value of the set of multiple slot offset values, the first slot offset value indicating a quantity of time slots between a third time slot associated with the first PMO and the second time slot.

Some examples of the method, apparatuses, and non-transitory computer-readable medium described herein may further include operations, features, means, or instructions for monitoring, via a first CC, the first set of one or more PMOs within at least the subset of the set of multiple time slots, monitoring, via a second CC, a second set of one or more PMOs, and transmitting, in the second time slot, the first feedback associated with the first CC and a second feedback according to a second codebook size associated with the second CC, where the second codebook size of the second feedback may be based on a second quantity of the second set of one or more PMOs.

Some examples of the method, apparatuses, and non-transitory computer-readable medium described herein may further include operations, features, means, or instructions for monitoring, via a first CC, the first set of one or more PMOs within at least the subset of the set of multiple time slots and transmitting, in the second time slot, the first feedback associated with the first CC and a second feedback according to a second codebook size associated with a second CC, where the second codebook size of the second feedback may be based on a second quantity of at least a subset of the first set of one or more PMOs associated with scheduling the second CC.

In some examples of the method, apparatuses, and non-transitory computer-readable medium described herein, each entry of the first feedback includes a quantity of bits corresponding to a quantity of codewords configured for data channel reception by the UE.

In some examples of the method, apparatuses, and non-transitory computer-readable medium described herein, the first bit and the second bit each indicate NACK based on not receiving control information during a corresponding PMO of the first set of one or more PMOs; or the first bit indicates a decoding result of a first codeword and the second bit indicates a NACK based on receiving a second DCI message during the corresponding PMO and the second DCI message scheduling a single codeword, the single codeword including the first codeword; or the first bit indicates an ACK and second bit indicates an ACK or a NACK based on receiving the second DCI message during the corresponding PMO and the second DCI message not scheduling a data transmission.

In some examples of the method, apparatuses, and non-transitory computer-readable medium described herein, each entry of the first feedback includes a quantity of bits corresponding to a quantity of code block groups (CBGs) configured for data channel reception by the UE.

In some examples of the method, apparatuses, and non-transitory computer-readable medium described herein, each bit of the quantity of bits indicates a NACK based on not receiving control information during a corresponding PMO of the first set of one or more PMOs; or a first subset of the quantity of bits indicates an ACK or a NACK and second subset of the quantity of bits indicates a NACK based on receiving a second DCI message during the corresponding PMO and the second DCI message scheduling a second quantity of CBGs that may be less than the quantity of CBGs configured for data channel reception by the UE; or a first bit of the quantity of bits indicates an acknowledgment and one or more remaining bits of the quantity of bits indicates an ACK or a NACK based on receiving the second DCI message during the corresponding PMO and the second DCI message not scheduling a data transmission.

Some examples of the method, apparatuses, and non-transitory computer-readable medium described herein may further include operations, features, means, or instructions for receiving, within the subset of the set of multiple time slots, one or more PDSCH transmissions, where one or more entries may be appended to the first feedback, and where each entry of the one or more entries corresponds to a respective PDSCH transmission of the one or more PDSCH transmissions.

In some examples of the method, apparatuses, and non-transitory computer-readable medium described herein, the one or more entries may be appended to the first feedback based on the one or more PDSCH transmissions being semi-persistently scheduled.

In some examples of the method, apparatuses, and non-transitory computer-readable medium described herein, each entry of the first feedback includes a quantity of bits corresponding to a quantity of PDSCH transmissions capable of being scheduled by a single DCI message during each PMO of the first set of one or more PMOs.

In some examples of the method, apparatuses, and non-transitory computer-readable medium described herein, the quantity of bits may be equal to one based on time domain feedback bundling being enabled for the UE.

In some examples of the method, apparatuses, and non-transitory computer-readable medium described herein, each entry of the first feedback includes a quantity of bits corresponding to a quantity of DCI messages associated with each PMO of the first set of one or more PMOs.

In some examples of the method, apparatuses, and non-transitory computer-readable medium described herein, the quantity of DCI messages corresponds to a quantity of frequency regions associated with each PMO of the first set of PMOs, the quantity of frequency regions based on a control resource set associated with the UE, a start of a control channel element, or both.

A method for wireless communications at a network entity is described. The method may include transmitting, in a first time slot, a first DCI message indicating a second time slot for a UE to transmit feedback according to a codebook size and receiving first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

An apparatus for wireless communications at a network entity is described. The apparatus may include a processor, memory coupled with the processor, and instructions stored in the memory. The instructions may be executable by the processor to cause the apparatus to transmit, in a first time slot, a first DCI message indicating a second time slot for a UE to transmit feedback according to a codebook size and receive first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

Another apparatus for wireless communications at a network entity is described. The apparatus may include means for transmitting, in a first time slot, a first DCI message indicating a second time slot for a UE to transmit feedback according to a codebook size and means for receiving first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

A non-transitory computer-readable medium storing code for wireless communications at a network entity is described. The code may include instructions executable by a processor to transmit, in a first time slot, a first DCI message indicating a second time slot for a UE to transmit feedback according to a codebook size and receive first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

Some examples of the method, apparatuses, and non-transitory computer-readable medium described herein may further include operations, features, means, or instructions for receiving a capability report indicating a capability of the UE to use a first type of feedback codebook that may have the first codebook size that corresponds to a quantity of PMOs, where the first feedback may be in accordance with the first type of feedback codebook and transmitting, based on receiving the capability report, RRC signaling indicating a configuration for the first type of feedback codebook, where the configuration may be associated with a cell group of the UE, a CC of the UE, or both.

Some examples of the method, apparatuses, and non-transitory computer-readable medium described herein may further include operations, features, means, or instructions for transmitting control information indicating a first set of slot offset values and a second set of offset values, where the subset of the set of multiple time slots may be based on the first set of slot offset values and the second set of slot offset values.

Some examples of the method, apparatuses, and non-transitory computer-readable medium described herein may further include operations, features, means, or instructions for transmitting an indication of a set of multiple slot offset values, where the first set of one or more PMOs within at least the subset of the set of multiple time slots that occur before the second time slot may be based on the set of multiple slot offset values.

Some examples of the method, apparatuses, and non-transitory computer-readable medium described herein may further include operations, features, means, or instructions for transmitting, during a first PMO of the first set of one or more PMOs, a second DCI message that schedules a physical downlink control channel transmission and indicates a first slot offset value of the set of multiple slot offset values, the first slot offset value indicating a quantity of time slots between a third time slot associated with the first PMO and the second time slot.

Some examples of the method, apparatuses, and non-transitory computer-readable medium described herein may further include operations, features, means, or instructions for receiving, in the second time slot, the first feedback associated with a first CC and a second feedback according to a second codebook size associated with a second CC, where the second codebook size of the second feedback may be based on a second quantity of a second set of one or more PMOs associated with the second CC.

BRIEF DESCRIPTION OF THE DRAWINGS

FIG. 15 shows a flowchart illustrating methods that support codebook size based on control channel monitoring occasions in accordance with one or more aspects of the present disclosure.

DETAILED DESCRIPTION

Figure 1:
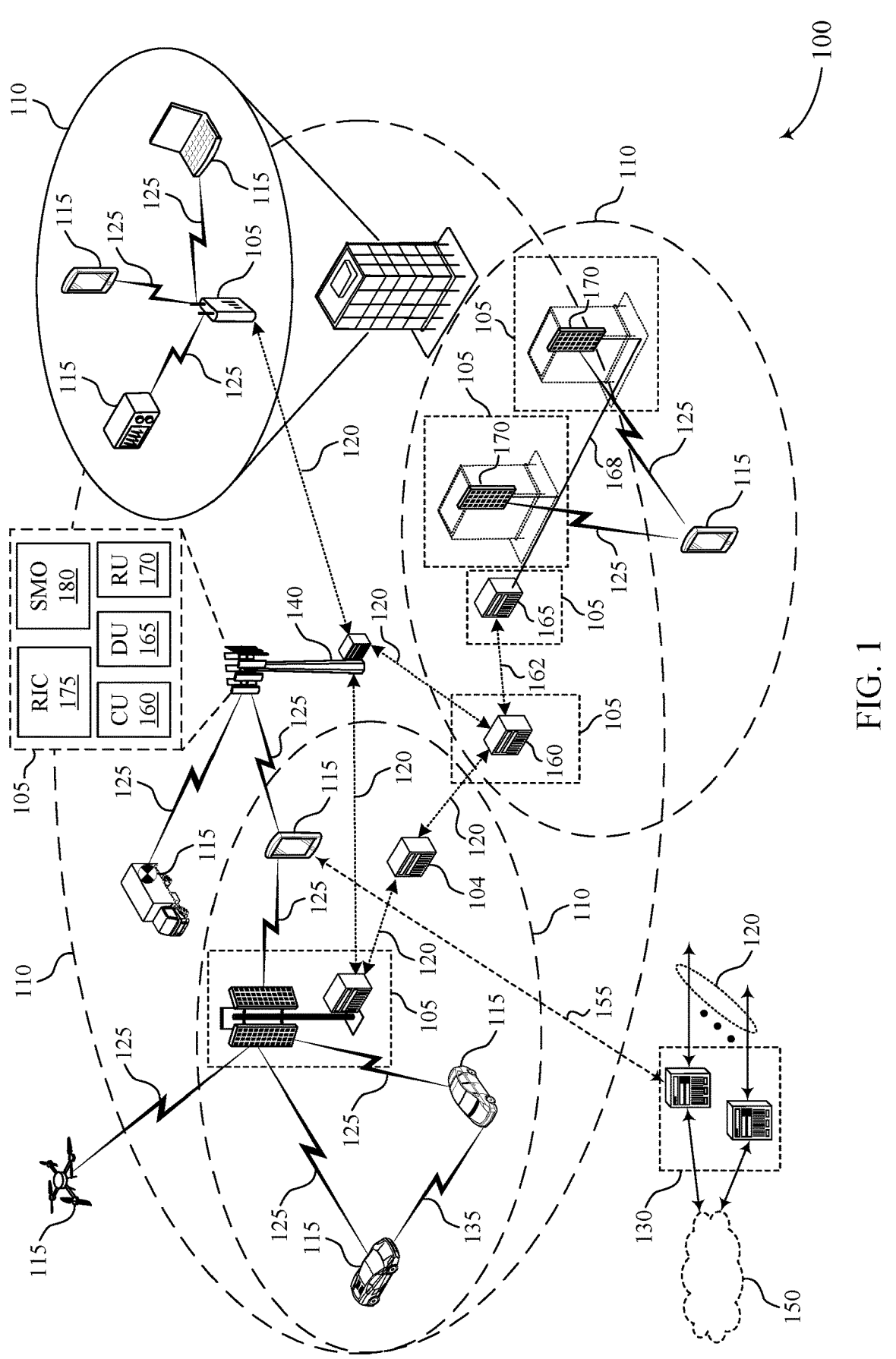
FIG. 1 shows an example of a wireless communications system that supports codebook size based on control channel monitoring occasions in accordance with one or more aspects of the present disclosure.

In some wireless communications systems, a user equipment (UE) may transmit feedback to indicate a decoding result, reception status, or the like of signaling received from a network entity. In some cases, the UE may transmit the feedback according to a codebook, which may include one or more entries (e.g., bits) to indicate feedback associated with one or more respective transmissions. For example, the UE may transmit the feedback according to a codebook that includes an entry for each respective candidate physical downlink shared channel (PDSCH) occasion over one or more time slots (e.g., a Type 1 codebook). Additionally, or alternatively, the UE may transmit the feedback according to a codebook that includes an entry for each downlink control information (DCI) message received during respective physical downlink control channel (PDCCH) monitoring occasions (PMOs) over the one or more time slots. In such an example, to determine a size of the codebook, the UE may receive a DCI message including a downlink assignment indicator (DAI), which may be a value corresponding to a quantity of DCIs to report feedback for (e.g., a Type 2 codebook). However, such techniques may result in the codebook having a relatively large size (e.g., due to a large quantity of candidate PDSCH occasions with Type 1), a mismatch of codebook sizes (e.g., due to incorrect DAI values if a DCI message is missed with Type 2), or both, which may increase overhead while communicating the codebook.

To support transmitting feedback according to a codebook while reducing signaling overhead, a UE may size the codebook according to a quantity of PMOs that occur before a feedback slot for transmitting the codebook (e.g., independent of PDSCH occasions and DCI messages). For example, the UE may identify a set of candidate time slots (e.g., according to a set of slot offset values) occurring before the feedback slot and may monitor one or more PMOs during the candidate slots. The UE may generate feedback according to a codebook that includes an entry (e.g., one or more bits) corresponding to each PMO, which may indicate the feedback associated with the corresponding PMO. For example, if the UE receives, during a first PMO, a DCI message that schedules a PDSCH transmission, the UE may set a corresponding feedback bit (e.g., a first entry of the codebook corresponding to the first PMO) according to a decoding result of the PDSCH transmission (e.g., an acknowledgement (ACK) or a negative acknowledgement (NACK)). As another example, such as if the UE does not detect a DCI during a second PMO, the UE may set a corresponding feedback bit (e.g., a second entry corresponding to the second PMO) to a NACK. Such techniques may reduce a size of the codebook, mitigate codebook size mismatch issues, and reduce signaling overhead for communicating feedback (e.g., compared to a Type 1 codebook or Type 2 codebook).

Aspects of the disclosure are initially described in the context of wireless communications systems. Aspects of the disclosure are further illustrated by and described with reference to resource diagrams. Aspects of the disclosure are further illustrated by and described with reference to apparatus diagrams, system diagrams, and flowcharts that relate to codebook size based on control channel monitoring occasions.

FIG. 1 shows an example of a wireless communications system 100 that supports codebook size based on control channel monitoring occasions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE- Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support codebook size based on control channel monitoring occasions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, a UE 115 may communicate feedback according to a codebook. For example, the UE 115 may indicate feedback for one or more downlink signals via one or more corresponding entries of the codebook. In some cases, the UE 115 may configure a size of the feedback codebook (e.g., a quantity of entries included in the codebook), or configured by a network entity 105 via control signaling, according to a type of the codebook, such as a Type 1 codebook or a Type 2 codebook.

In a first example, if the UE 115 uses a Type 1 codebook, the UE 115 may configure the feedback codebook such that the codebook includes an entry for each candidate PDSCH occasion that occurs over a set of one or more candidate time slots. In some cases, UE 115 may determine the one or more candidate time slots according to a set of configured slot offset values (e.g., K1 values indicating an offset between a PDSCH time slot and a feedback time slot), which may be associated with a downlink serving cell (e.g., a component carrier (CC)) of the UE. For example, the set of time slots may be a set of contiguous time slots that occur before a slot allocated for transmitting the feedback codebook (e.g., K1={1,2,3,4,5,6,7,8,} if DCI 1_0 is configured for the serving cell and DCI 1_1 is not configured for the serving cell). As another example, the set of time slots may be indicated by a network entity (e.g., K1 provided by dl-DataToUL-ACK if DCI format 1_1 or DCI format 1_2 is configured for the serving cell).

In some examples, the UE 115 may identify a set of one or more PDSCH time domain resource allocation (TDRA) candidates for each respective candidate time slot, which may correspond to a start and length indicators (SLIV) associated with the respective candidate time slot (e.g., indicating a quantity of symbols which can be allocated for PDSCH transmission). To identify the candidate PDSCH reception occasions for a candidate time slot, the UE 115 may remove one or more TRDA candidates of the slot (e.g., TDRA candidates that overlap with semi-static uplink symbols), and may group remaining TDRA candidates to determine the quantity (e.g., a maximum quantity) of candidate PDSCH reception occasions (e.g., a quantity of entries in the feedback codebook corresponding to the time slot). The UE 115 may then size the feedback codebook according to a cumulative quantity of PDSCH reception occasions included in each candidate time slot, which may support the UE 115 indicating a feedback status for one or more PDSCH transmissions received during the candidate PDSCH reception occasions.

In a second example, if the UE 115 determines to use a Type 2 codebook, the UE 115 may configure the feedback codebook such that the codebook includes an entry for each DCI received by the UE 115. In some cases, the UE 115 may identify the quantity of DCIs according to a downlink assignment indicator (DAI), which may indicate whether the UE 115 missed reception of a DCI. For example, the UE 115 may receive, during one or more PMOs, one or more DCIs (e.g., with DCI format 1_0, 1_1, or 1_2) that include a DAI value. According to an ordering of the one or more PMOs, the UE 115 may order the one or more DCIs and identify the DAI values associated with the one or more DCIs to detect if a DCI was missed. For example, the UE 115 may identify that a first received DCI indicates a DAI value of '1' and a second received DCI indicates a DAI value of '3', and may determine that a DCI associated with a DAI value of '2' was missed (e.g., a DAI hole). In such an example, the UE 115 may include a NACK in the feedback codebook corresponding to the missed DCI.

In some cases, the DAI may be indicated by one or more fields included in a DCI message. For example, a counter DAI field may indicate an accumulative quantity of serving cell and PMO pairs in which a DCI message is detected (e.g., a DCI message associated with feedback, which may or may not schedule a PDSCH transmission) up to a current serving cell and current PMO. In some cases, the counter DAI field may increment by serving cell first and by PMO second, which may support the UE 115 identifying if multiple DCI messages are received in a same PMO (e.g., via different serving cells). As another example, a total DAI field may indicate a total quantity of serving cell and PMOs pairs in which a DCI message is detected up to a current PMO (e.g., updated for each PMO). In some cases, the UE 115 may assume, for a same PMO, that the total DAI value is the same for each DCI format (e.g., DCI 1_1 or 1_2).

In some examples, usage of a Type 1 codebook or Type 2 codebook for communicating feedback may result in significant signaling overhead, mismatched codebook sizes, or both. For example, if the UE 115 uses a Type 1 codebook, a size of the codebook may be relatively large (e.g., to accommodate as many bits as potential PDSCH receptions). As an example, if a TDRA configuration includes a quantity of SLIVs in a time slot (e.g., seven SLIVs corresponding to symbols {0,1}, {2,3}, {4,5}, . . . , {12, 13}), a corresponding quantity of entries (e.g., seven bits) may be included in the feedback codebook per candidate time slot per CC (e.g., for K1={1,2,3}, the codebook includes 7*3 bits per CC in an FDD pattern). Additionally, or alternatively, the UE 115 may be unable to include an entry in the codebook for a DCI message that does not schedule a PDSCH transmission (e.g., a DCI message associated with a semi-persistently scheduled (SPS) release message, a secondary serving cell dormancy indication, a transmission configuration indicator (TCI) state change, or the like).

As another example, if the UE 115 uses a Type 2 codebook, a signaling overhead associated with communicating a DCI message may be increased. For example, a downlink DCI message may include additional bits to indicate a counter DAI field and a total DAI field, and an uplink DCI message may include additional bits to indicate the total DAI field (e.g., when HARQ-ACK is multiplexed with physical uplink shared channel (PUSCH) transmissions). Additionally, or alternatively, a codebook size mismatch may occur if one or more DCI messages are missed and the feedback codebook is communicated prior to receiving an updated DAI value. For example, if the UE 115 misses a last DCI message prior to communicating the feedback, the UE 115 may be unaware of the missed DCI message and may not include an entry in the feedback codebook corresponding to the missed DCI message. As another example, such as when the DAI is indicated via two bits, the UE 115 may be unable to detect if more than four consecutive DCI messages are missed (e.g., due to an interference burst), which may incur a codebook size mismatch.

To mitigate adverse effects associated with Type 1 and Type 2 codebooks, the UE 115 may communicate feedback according to a codebook that includes an entry corresponding to each PMO over a set of candidate time slots. For example, when compared to a Type 2 codebook, a PMO based codebook may have improved robustness when a DCI message is missed (e.g., due to the quantity of configured PMOs being independent of received DCI messages), may reduce a signaling overhead associated with DCI messages (e.g., due to not allocating bits for a DAI), or both. When compared to a Type 1 codebook, the PMO based codebook may have a smaller size if a quantity of PMOs in a slot is less than a quantity of non-overlapping SLIVs in the slot, the UE 115 is capable of receiving more than one PDSCH transmission per slot, or both. In some cases, a size may be reduced when a TDRA granularity is greater than a maximum quantity of PDSCH transmissions that can be scheduled per slot. For example, to accommodate different UEs 115 with small packets and low latency, a TDRA may include at least seven non-overlapping mini slots (e.g., candidate PDSCH occasions) each corresponding to two symbols of the slot and the UE 115 may be configured to receive two non-overlapping PDSCH transmissions per slot (e.g., scheduled by two configured PMOs). In such an example, a size associated with reporting feedback for the slot according to a Type 1 codebook (e.g., seven bits corresponding to the seven candidate PDSCH occasions) may be greater than a size associated with reporting feedback for the slot according to the PMO based codebook (e.g., two bits for the two configured PMOs).

As another example, for a maximum quantity of non-overlapping SLIVs per slot, M, and a maximum quantity of PDSCH transmissions that are schedulable per slot, k, a PDCCH configuration may result in k PMOs per slot. In some cases, such as when k=1, a Type 1 codebook may include one bit per slot (e.g., due to one PDSCH occasion being utilized) and a PMO based codebook may include one bit per slot. In some other cases, such as when M>k>1, a Type 1 codebook may include Mbits per slot and a PMO based codebook may include k bits per slot. In some examples, a quantity of bits for a Type 1 codebook may be reduced (e.g., an optimized Type 1 codebook), and a theoretical lower bound of the quantity of bits per slot may be represented by $$\log_2\left(\left\lceil \sum\nolimits_{i=0}^{\lfloor k/2 \rfloor} \binom{M}{i} \right\rceil\right).$$

For the example of M=7 and k=2, a regular Type 1 codebook may include seven bits, an optimized Type 1 codebook (e.g., associated with a greater complexity) may include at least three bits (e.g., $\log_2(1+7)=3$), and the PMO based codebook (e.g., associated with less complexity) may include two bits. Additionally, when compared to the Type 1 codebook, the PMO based codebook may improve handling of DCI messages that do not schedule a PDSCH transmission but are associated with feedback reporting (e.g., a DCI message related to an SPS release indication, a secondary serving cell dormancy indication, a TCI state change, or the like).

Figure 2:
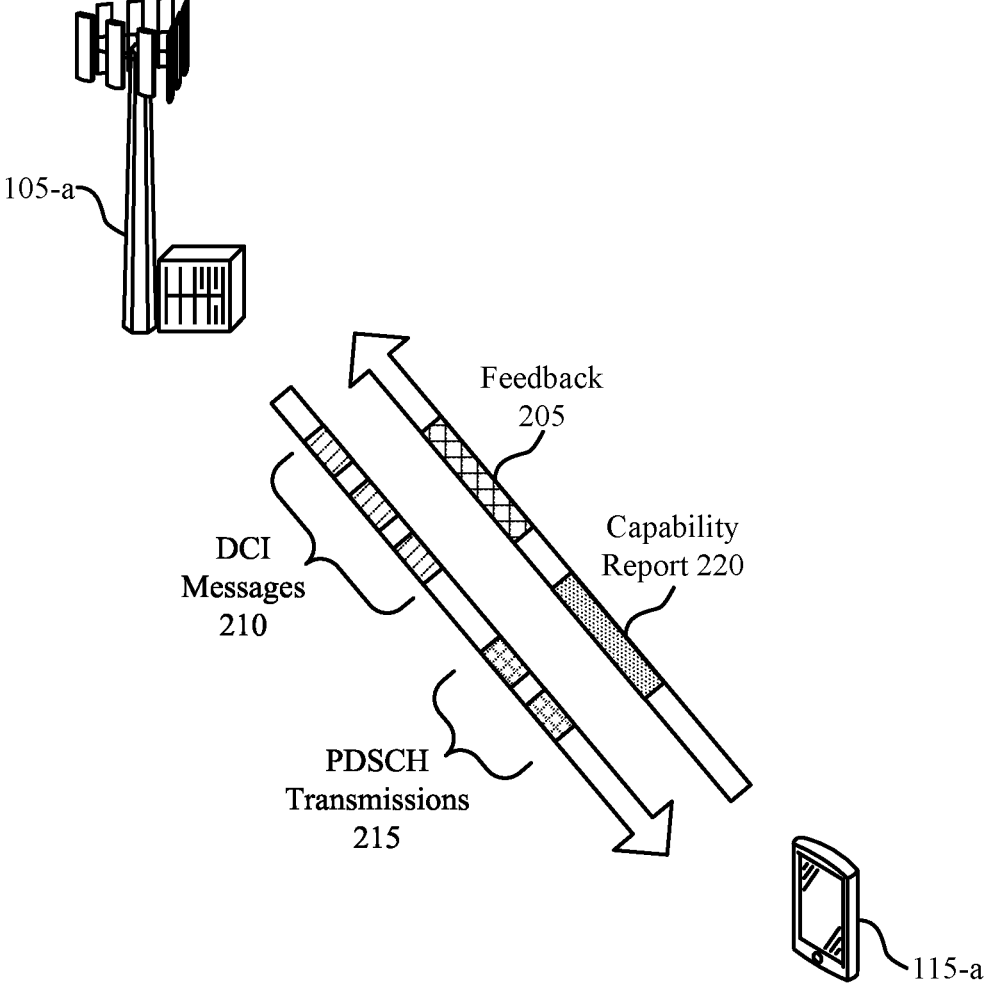
FIG. 2 shows an example of a wireless communications system that supports codebook size based on control channel monitoring occasions in accordance with one or more aspects of the present disclosure.

FIG. 2 shows an example of a wireless communications system 200 that supports codebook size based on control channel monitoring occasions in accordance with one or more aspects of the present disclosure. The wireless communications system 200 may include one or more aspects of the wireless communications system 100. For example, the wireless communications system 200 may include a network entity 105-a and a UE 115-a, which may be examples of corresponding devices described with reference to FIG. 1. In some cases, the wireless communications system 200 may support the UE 115-a communicating feedback 205 with the network entity 105-a according to a codebook size that is determined based on a quantity of PMOs that occur during a set of candidate time slots.

In some cases, the UE 115-a may generate a codebook for the feedback 205 that includes a sequence of one or more entries (e.g., a sequence of one or more bits) that indicate feedback for one or more downlink transmissions. In some examples, each entry of the codebook for the feedback 205 may correspond to a respective PMO that occurs during a set of candidate time slots. For example, the UE 115-a may monitor one or more PMOs to receive one or more DCI messages 210 from the network entity 105-a. In some examples, DCI messages 210 may each indicate that the UE 115-a is to report feedback associated with a respective DCI message in a given slot (e.g., transmit HARQ feedback in slot n). For example, if a DCI message 210 schedules a PDSCH transmission 215, the UE 115-a may set a corresponding entry (e.g., a bit corresponding to a PMO the DCI message 210 was received in) of the codebook for the feedback 205 according to a decoding result of the PDSCH transmission 215 (e.g., an ACK or a NACK). As another example, such as if a DCI message 210 does not schedule a PDSCH transmission 215 (e.g., a DCI message associated with an SPS release, a secondary serving cell dormancy, or a TCI state change, among other examples), the UE 115-a may set the corresponding entry of the codebook for the feedback 205 to an ACK (e.g., indicating successful decoding of the DCI). In some cases, such as when no DCI message 210 is received during a PMO or the DCI message 210 does not indicate to transmit feedback in the given slot (for HARQ feedback in slot n), the UE 115-a may set the corresponding entry of the codebook for the feedback 205 to NACK.

In some examples, the UE 115-a may determine candidate slots for monitoring PMOs according to a set of slot offset values (e.g., relative to the slot n for transmitting the feedback 205). For example, a size of the codebook for the feedback 205 may be determined based on the quantity of PMOs included in a set of candidate time slots $$ n - \{K'_{1,k}\}, \text{ where } K'_1 = \{K'_{1,0}, K'_{1,1}, \dots \} $$

may be the set of possible slot offset values between the one or more DCI messages 210 and the slot for transmitting the feedback 205. The UE 115-a may identify the set of slot offset values using one or more techniques as described further below with reference to FIG. 3.

In some examples, the UE 115-a may refrain from monitoring a PMO if the UE 115-a identifies that the PMO overlaps with one or more semi-static uplink symbols (e.g., when communicating according to a time domain duplexing (TDD) pattern). Additionally, or alternatively, the UE 115-a may not report feedback for a PMO that is not configured for monitoring a downlink DCI format associated with feedback reporting (e.g., if a search space (SS) set is configured for monitoring DCI formats other than 10, 1_1, or 1_2, the PMOs associated with the SS set are not considered for the feedback 205 codebook). Hence the set of PMOs or the quantity of PMOs the UE considers for generating the codebook (e.g., for the feedback 205) may not include the PMOs that overlap with semi-static uplink symbols or may not include the PMOs that are not configured for monitoring a downlink DCI format associated with feedback reporting.

In some cases, the UE 115-a may transmit a capability report 220 to the network entity 105-a indicating one or more capabilities of the UE 115-a. For example, the capability report 220 may indicate a capability of the UE 115-a to receive more than one PDSCH transmission 215 per time slot. Additionally, or alternatively, the capability report 220 may indicate capabilities related to a quantity of downlink DCI messages 210 that can be processed by the UE 115-a. For example, the UE 115-a may indicate, in the capability report 220, a first capability (e.g., feature group (FG) 3-1, which may be supported by all UEs 115) to process a single unicast DCI message 210 per time slot (e.g., for a given scheduled CC or carrier indicator field (CIF) value).

As another example, the UE 115-a may indicate, in the capability report 220, a second capability (e.g., FG 18-5c) to process up to X unicast downlink DCI messages 210 per time slot of a scheduling CC (e.g., for cross-CC scheduling, as described further below with reference to FIG. 4B). In such an example, X may be determined according to a subcarrier spacing (SCS) range configured for the CC (e.g., X={1,2,4} for an SCS range of (15 kHz, 120 kHz), (15 kHz, 60 kHz), and (30 kHz, 120 kHz), and X={2} for an SCS range of (15 kHz, 30 kHz), (30 kHz, 60 kHz), and (60 kHz, 120 kHz)). In some examples, the UE 115-a may indicate, in the capability report 220, a third capability (e.g., FG 3-5a) to process one downlink DCI message 210 per PMO, where multiple PMOs may be configured per time slot (e.g., up to four PMOs for a 30 kHz SCS). In some examples, the UE 115-a may indicate, in the capability report 220, a fourth capability (e.g., FG 3-5b) to perform span-based PDCCH monitoring, where a quantity of PDCCH spans are associated with a time slot (e.g., up to two, four, or seven PDCCH spans, where each PDCCH span may include one or more PMOs that are within two or three consecutive symbols), and the UE 115-a may process one downlink DCI message 210 per span (e.g., for an FDD pattern) or the UE 115-a may process up to two downlink DCI messages 210 per span (e.g., for a TDD pattern). It is noted that the techniques discussed herein may refer to the capability of a UE to process a quantity of DCIs per slot, however these same techniques may be applied per PDCCH for span-based PDCCH monitoring. Furthermore, it is noted that the techniques discussed herein may refer to each entry of the feedback codebook being associated with a PMO, however the same techniques may be applied for each entry of the feedback codebook being associated with a PDCCH span.

Figure 3:
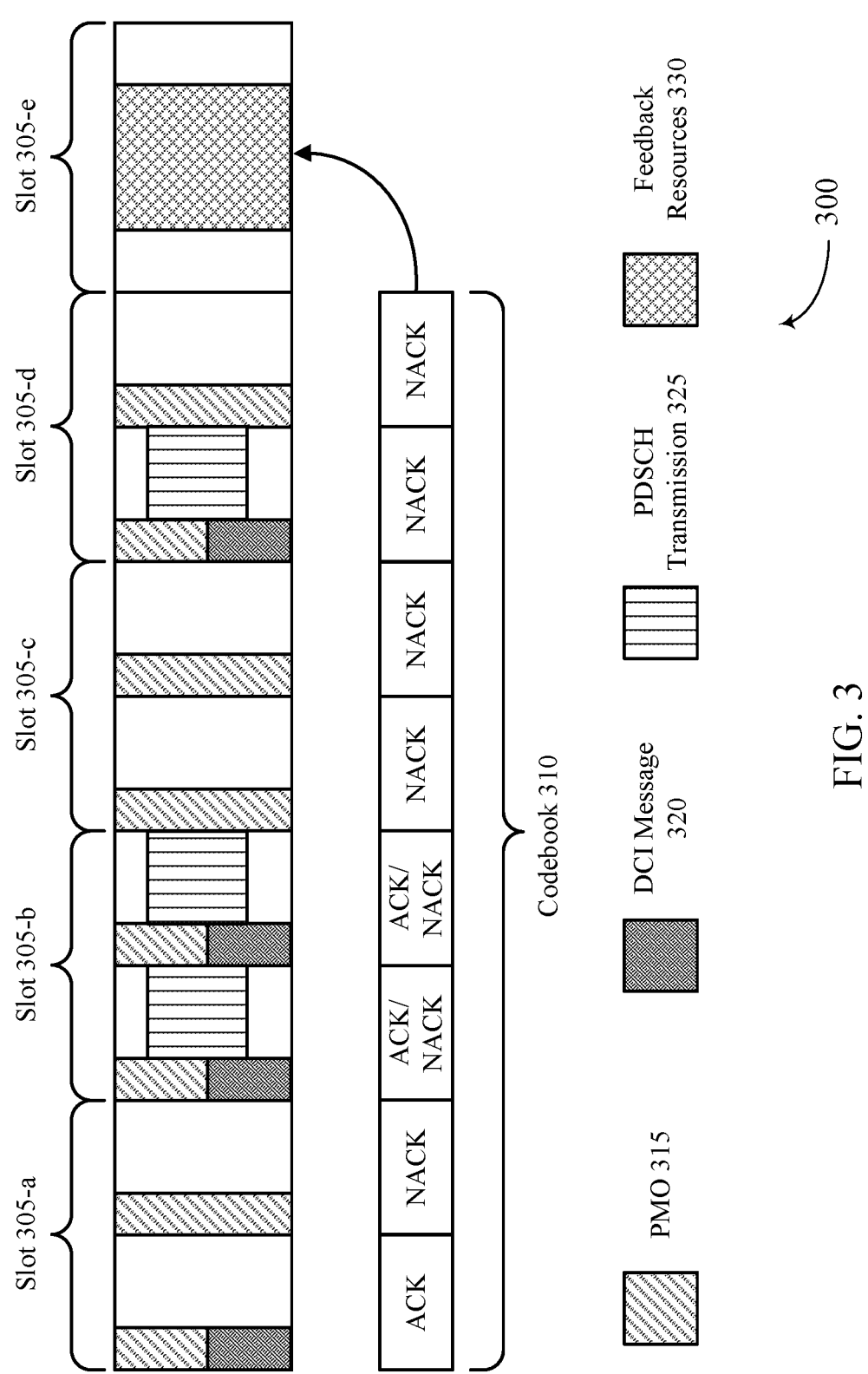
FIG. 3 shows an example of a resource diagram that supports codebook size based on control channel monitoring occasions in accordance with one or more aspects of the present disclosure.

FIG. 3 shows an example of a resource diagram 300 that supports codebook size based on control channel monitoring occasions in accordance with one or more aspects of the present disclosure. The resource diagram 300 may be implemented by one or more aspects of the wireless communications system 100 and the wireless communications system 200. For example, the resource diagram 300 may be an example of time-frequency resources allocated for signaling between a network entity 105 and a UE 115, which may be examples of corresponding devices described with reference to FIGS. 1 and 2. In some cases, the resource diagram 300 may include a set of candidate time slots 305-*a*, 305-*b*, 305-*c*, and 305-*d*, a feedback time slot 305-*e*, as well as a feedback codebook 310 indicating feedback associated with the candidate time slots 305. In some cases, the resource diagram 300 may be associated with a single CC configured for the UE 115. It should be noted that the resource diagram 300 is not limited to the illustrated quantity of candidate time slots 305, and may include any quantity of candidate time slots 305 and corresponding feedback codebook 310 entries.

In some cases, the UE 115 may monitor one or more PMOs 315 during each candidate time slot 305, and may include a corresponding entry for each PMO 315 in the feedback codebook 310. For example, the UE 115 may monitor two PMOs 315 during each candidate time slot 305 and may include a respective entry (e.g., bit) in the feedback codebook 310 for each PMO 315. In some examples, UE 115 may set an entry of the feedback codebook 310 for a corresponding PMO 315 according to signaling that occurs during the corresponding PMO 315.

For example, during a first PMO 315 of the time slot 305-*a*, the UE 115 may receive a DCI message 320 that does not schedule a PDSCH transmission and may indicate that the UE 115 is to transmit feedback for the DCI message 320 in the time slot 305-*e*. In such an example, the UE 115 may set a corresponding entry of the feedback codebook 310 (e.g., a first entry) to an ACK (e.g., indicating successful decoding of the DCI message 320). In some cases, the UE 115 may monitor a second PMO 315 of the time slot 305-*a* and may not detect a DCI message 320 during the second PMO 315 (e.g., a DCI message 320 was not sent by the network entity 105 or the UE 115 failed to receive a DCI message 320). In such an example, the UE 115 may set a corresponding entry of the feedback codebook 310 (e.g., a second entry) to a NACK.

During the time slot 305-*b*, the UE 115 may monitor a third PMO 315 and a fourth PMO 315 that each schedule a respective PDSCH transmission 325 within the time slot 305-*b*. For example, the UE 115 may receive a DCI message 320 in each of the third PMO 315 and the fourth PMO 315 that schedule respective PDSCH transmissions 325, where the DCI messages 320 may indicate to transmit feedback (e.g., feedback for the PDSCH transmissions 325) in the slot 305-*e*. In such an example, the UE 115 may set corresponding entries of the feedback codebook 310 (e.g., a third entry and a fourth entry) according to a decoding result of the respective PDSCH transmission 325 (e.g., an ACK or a NACK depending on whether the PDSCH transmission 325 was successfully decoded).

During the time slot 305-*c*, the UE 115 may monitor a fifth PMO 315 and a sixth PMO 315 and may not detect DCI messages 320 during the fifth PMO 315 and the sixth PMO 315. For example, the UE 115 may fail to receive a DCI message 320 or the network entity 105 may refrain from transmitting a DCI message 320 during each of the fifth PMO 315 and the sixth PMO 315. In such an example, the UE 115 may set corresponding entries of the feedback codebook 310 (e.g., a fifth entry and a sixth entry) to a NACK.

During the time slot 305-*d*, the UE 115 may monitor a seventh PMO 315 and may receive a DCI message 320 the schedules a PDSCH transmission 325 within the time slot 305-*d*. In some cases, the DCI message 320 may indicate to transmit feedback (e.g., feedback for the PDSCH transmission 325) in a time slot that is different than the time slot 305-*e* (e.g., a later time slot that is not associated with the feedback codebook 310). In such an example, the UE 115 may set a corresponding entry of the feedback codebook 310 to a NACK (e.g., independent of a decoding result of the PDSCH transmission 325). Additionally, during the time slot 305-*d*, the UE 115 may monitor an eighth PMO 315 and may not detect a DCI message 320 during the eighth PMO 315. In such an example, the UE 115 may set a corresponding entry of the feedback codebook 310 (e.g., an eighth entry) to a NACK.

During the time slot 305-*e*, the UE 115 may transmit, via one or more allocated feedback resources 330, feedback to the network entity 105 according to the feedback codebook 310. For example, the UE 115 may indicate feedback corresponding to each PMO 315 of the set of candidate time slots 305-*a*, 305-*b*, 305-*c*, and 305-*d* via the feedback codebook 310. In some examples, the UE 115 may transmit a HARQ message including the feedback according to the feedback codebook 310, which may include a sequence of entries (e.g., a sequence of bits) including a respective feedback status for each PMO 315 of the set of candidate time slots 305-*a*, 305-*b*, 305-*c*, and 305-*d* (e.g., each bit of the feedback codebook 310 corresponding to a respective PMO 315).

In some examples, the UE 115 may determine the set of candidate time slots 305 according to a set of possible slot offsets $$K_1'$$

(e.g., relative to the slot 305-*e*, which may be referred to as slot n). For example, the time slot 305-*a* may be an example of a first slot offset value (e.g., n−4), the time slot 305-*b* may be an example of a second slot offset value (e.g., n−3), the time slot 305-*c* may be an example of a third slot offset value (e.g., n−2), and the time slot 305-*d* may be an example of a fourth slot offset value (e.g., n−1). To identify the set of possible slot offsets, the UE 115 identify one or more sets of configured slot offset values.

In a first example, the UE 115 may receive control information (e.g., via RRC signaling) including a first set of slot offset values, k0, and a second set of slot offset values, k1, which may support generating the feedback codebook 310. In some cases, a DCI message 320 may include a first field (e.g., a TDRA field in a DCI message 320), which may indicate a value from the first set of slot offset values (e.g., a single k0 value), and a second field (e.g., a PDSCH-to-HARQ_feedback timing indicator field), which may indicate a values from the second set of slot offset values (e.g., a single k1 value). In some cases, the first set of slot offset values may include one or more possible slot offsets between a DCI message 320 and a corresponding PDSCH transmission 325 (e.g., according to rows of a TDRA table configured by a network entity 105 using control signaling) and the second set of slot offset values may include one or more possible slot offsets between a PDSCH transmission 325 and the corresponding feedback resources 330. In some examples, UE 115 may determine the set of possible slot offsets, $$K_1',$$

according to one or more unique values obtained when summing each element of the first set of offset values and the second set of offset values. For example, the UE 115 may identify the first set of offset values as k0={0,1}, may identify the second set of offset values as k1={1,2,3,4}, and may determine the set of possible slot offset values as $$K_1' = \{1, 2, 3, 4, 5\}.$$

In such an example, a DCI message 320 received in the time slot 305-*a* may indicate a PDSCH transmission 325 in the time slot 305-*b* (e.g., k0=1) and the PDSCH transmission 325 in the slot 305-*b* may indicate the feedback resources 330 in the slot 305-*e* (e.g., k1=3), which may support the UE 115 identifying the slot offset between the DCI message 320 and the feedback resources 330

(e.g., $K_1' = 4$).

In a second example, the UE 115 may be configured (e.g., in advance by a network entity 105 via control signaling) with the set of possible slot offset values $$K_1',$$

and the network entity 105 may indicate the slot offset (e.g., from the set of configured possible slot offset values) between a DCI message 320 and the feedback resources 330 in the DCI message 320. In such an example, a DCI message 320 received in the time slot 305-*a* may indicate the feedback resources 330 in the time slot 305-*e*

(e.g., $K_1' = 4$).

In an example, the DCI message 320 may indicate both k0 and k0', and thus the DCI message 320 may indicate a slot offset between the DCI message 320 and feedback slot (e.g., HARQ-Ack) from the set of configured possible slot offset values.

In some examples, a CC used for communications between the network entity 105 and the UE 115 may support multiple transport blocks (TBs), codewords, or both per PDSCH transmission 325. For example, the CC may be configured with two TBs per PDSCH transmission 325 (e.g., which may be supported for more than four spatial layers). In some examples, such as if spatial HARQ-ACK bundling (e.g., across the two TBs) is not configured, the UE 115 may configure the entries of the feedback codebook 310 to each include two bits (e.g., each bit indicating feedback for a respective TB). For example, if the UE 115 monitors a PMO 315 and does not detect a DCI message 320, the UE 115 may insert two NACKs in an entry of the feedback codebook 310 corresponding to the PMO 315. As another example, if the UE 115 monitors a PMO 315 and receives a DCI message 320 that schedules one TB, a first bit of a corresponding entry of the feedback codebook 310 may be set according to a decoding result of the scheduled TB and a second bit of the corresponding entry may be set to a NACK. As another example, if the UE 115 monitors a PMO 315 and receives a DCI message 320 that does not schedule a PDSCH transmission 325 but is associated with feedback, the UE 115 may set each bit of a corresponding entry of the feedback codebook 310 to an ACK, or may set the first bit of the corresponding entry to an ACK and the second bit of the corresponding entry to a NACK.

In some examples, the CC may be configured with code block group (CBG)-based PDSCH receptions, which may support a quantity (e.g., a maximum quantity) of N CBGs. In such an example, the UE 115 may configure the entries of the feedback codebook 310 to each include Nbits (e.g., each bit indicating feedback for a respective CBG). For example, if the UE 115 monitors a PMO 315 and does not detect a DCI message 320, the UE 115 may insert NNACKs in an entry of the feedback codebook 310 corresponding to the PMO 315. As another example, if the UE 115 monitors a PMO 315 and receives a DCI message 320 that schedules fewer than N CBGs (e.g., scheduling n CBGs, where n<N), the UE 115 may set a first subset of bits (e.g., n bits) in a corresponding entry of the feedback codebook 310 according to a decoding result of the scheduled CBGs and may set a second subset of the bits (e.g., the remaining N−n bits) in the corresponding entry to NACKs. As another example, if the UE 115 monitors a PMO 315 and receives a DCI message 320 that does not schedule a PDSCH transmission 325 but is associated with feedback, the UE 115 may set each bit of a corresponding entry of the feedback codebook 310 to an ACK, or may set the first bit of the corresponding entry of the feedback codebook 310 to an ACK and the remaining bits (e.g., N−1 bits) of the corresponding entry to NACKs.

In some cases, the UE 115 may be configured to support one or more semi-persistent scheduling (SPS) configurations and may receive one or more PDSCH transmissions 325 that are not scheduled by a DCI message 320 (e.g., due to being scheduled semi-persistently). Such PDSCH transmissions 325 may not be associated with a PMO 315, and the UE 115 may determine to append one or more entries to the feedback codebook 310 that correspond to the SPS PDSCH transmissions 325. For example, during the set of candidate slots 305-*a* through 305-*d*, the UE 115 may receive a quantity of SPS PDSCH transmissions 325, may generate respective feedback for each of the SPS PDSCH transmissions 325 (e.g., according to respective decoding results of the SPS PDSCH transmissions 325), and may append a corresponding quantity of entries to the feedback codebook 310 indicating the feedback for each of the SPS PDSCH transmissions 325 (e.g., in addition to the entries of the feedback codebook 310 corresponding to PMOs 315). In some cases, the additional entries may be generated separately from the entries of the feedback codebook 310 corresponding to PMOs 315, and may be sized differently.

In some examples, the CC may be configured to support a single DCI message 320 scheduling multiple PDSCH transmissions 325 (e.g., for an SCS of 120 kHz, 480 kHz, or 960 kHz). For example, a TDRA field of a DCI message 320 may indicate an entry (e.g., a row) from a configured TDRA table, where each entry may correspond to multiple k0 values (e.g., multiple possible slot offsets between the DCI message 320 and a scheduled PDSCH transmission 325) and multiple SLIVs for the multiple PDSCH transmissions 325. In some examples, an indicated row of the TDRA table may determine the quantity of scheduled PDSCH transmissions 325 (e.g., according to the quantity of k0 values and SLIVs indicated by the row). To indicate feedback for the multiple PDSCH transmissions 325 scheduled by a same DCI message 320, the UE 115 may include one or more bits in an entry of the feedback codebook 310. In one example, one DCI may be detected in a PMO where the DCI schedules multiple PDSCHs. In some cases, the feedback codebook 310 may include a same quantity of feedback bits as the quantity of the multiple PDSCHs. In another example, if time domain HARQ-ACK bundling is enabled for the UE 115, the UE 115 may indicate the feedback for the multiple PDSCH transmissions 325 via one bit (e.g., by applying a logical AND across all decoding results of the valid SLIVs scheduled by a same DCI message 320).

In some cases, when the CC is configured with a TDRA table with one or more rows containing multiple SLIVs for PDSCH transmissions 325 and HARQ-ACK bundling is not enabled for the UE 115, the UE 115 may generate the feedback codebook 310 for the CC according to a non-PMO based codebook type (e.g., a Type 1 codebook or a Type 2 codebook). In such an example, the UE 115 may concatenate a payload of multiple codebook types (e.g., for multiple different CCs) due to the codebook type being configured per CC (e.g., rather than per cell group). For example, the UE 115 may concatenate a payload of a Type 1 codebook (e.g., corresponding to a first CC) with a payload of a PMO-based codebook (e.g., corresponding to a second CC).

In some other cases, the UE 115 may generate the feedback codebook 310 to include Nbits per PMO 315 (e.g., per entry of the feedback codebook 310), where N may correspond to a maximum quantity of SLIVs included in rows of the configured TDRA table (e.g., a maximum quantity of PDSCH transmissions 325 that can be scheduled by a DCI message 320). As an example, if the UE 115 monitors a PMO 315 and does not detect a DCI message 320, the UE 115 may insert a NACK for each of the Nbits in an entry of the feedback codebook 310 corresponding to the PMO 315. As another example, if the UE 115 monitors a PMO 315 and receives a DCI message 320 that schedules fewer than NPDSCH transmissions 325 (e.g., scheduling n PDSCH transmissions 325, where n<N), the UE 115 may set a first subset of bits (e.g., n bits) in the corresponding entry of the feedback codebook 310 according to a decoding result of the scheduled PDSCH transmissions 325 and may set a second subset of the bits (e.g., the remaining N−n bits) in the corresponding entry to NACKs. As another example, if the UE 115 monitors a PMO 315 and receives a DCI message 320 that does not schedule a PDSCH transmission 325 but is associated with feedback reporting, the UE 115 may set each bit of the corresponding entry of the feedback codebook 310 to an ACK, or may set the first bit of the corresponding entry to an ACK and the remaining bits (e.g., N−1 bits) of the corresponding entry to NACKs. In some examples, such as when time domain HARQ-ACK bundling is enabled for the UE 115, the UE 115 may configure the feedback codebook 310 such that N=1 (e.g., each PMO corresponds to one bit in the feedback codebook 310).

To determine the set of candidate time slots 305 (e.g., the time slots 305-*a*, 305-*b*, 305-*c*, and 305-*d*), the UE 115 may identify the set of slot offset values, $$K_1',$$

according to rows of the TDRA table. Table 1 below shows an example of a TDRA table for scheduling up to four PDSCH transmissions 325 (e.g., N=4 if time domain HARQ-ACK bundling is not enabled):

TABLE 1

| TDRA Row | First PDSCH | Second PDSCH | Third PDSCH | Fourth PDSCH |
|----------|-------------|--------------|-------------|--------------|
| 1 | k0 = 2 | k0 = 3 | — | — |
| 2 | k0 = 0 | k0 = 1 | k0 = 2 | — |
| 3 | k0 = 2 | k0 = 3 | k0 = 4 | k0 = 5 |
| . . . | . . . | . . . | . . . | . . . |

In some cases, the UE 115 may determine a set of k0 values (e.g., to support determining $$K_1'$$

according to a set of k0 values and a set of k1 values) according to a last k0 value of each TDRA row (e.g., corresponding to a last SLIV). For example, if the UE 115 determines the set of k0 values according to Table 1, the UE 115 may identify the set of k0 values as {3,2,5} (e.g., corresponding to TDRA rows 1, 2, and 3, respectively). In such an example, if the set of k1 values is configured to be {1,2,3,4}, the UE 115 may identify the set of possible slot offset values as $$K_1' = \{3, 4, 5, 6, 7, 8, 9\}$$

(e.g., a set of unique values from summing each element of k0 and k1).

Figures 4A, 4B:
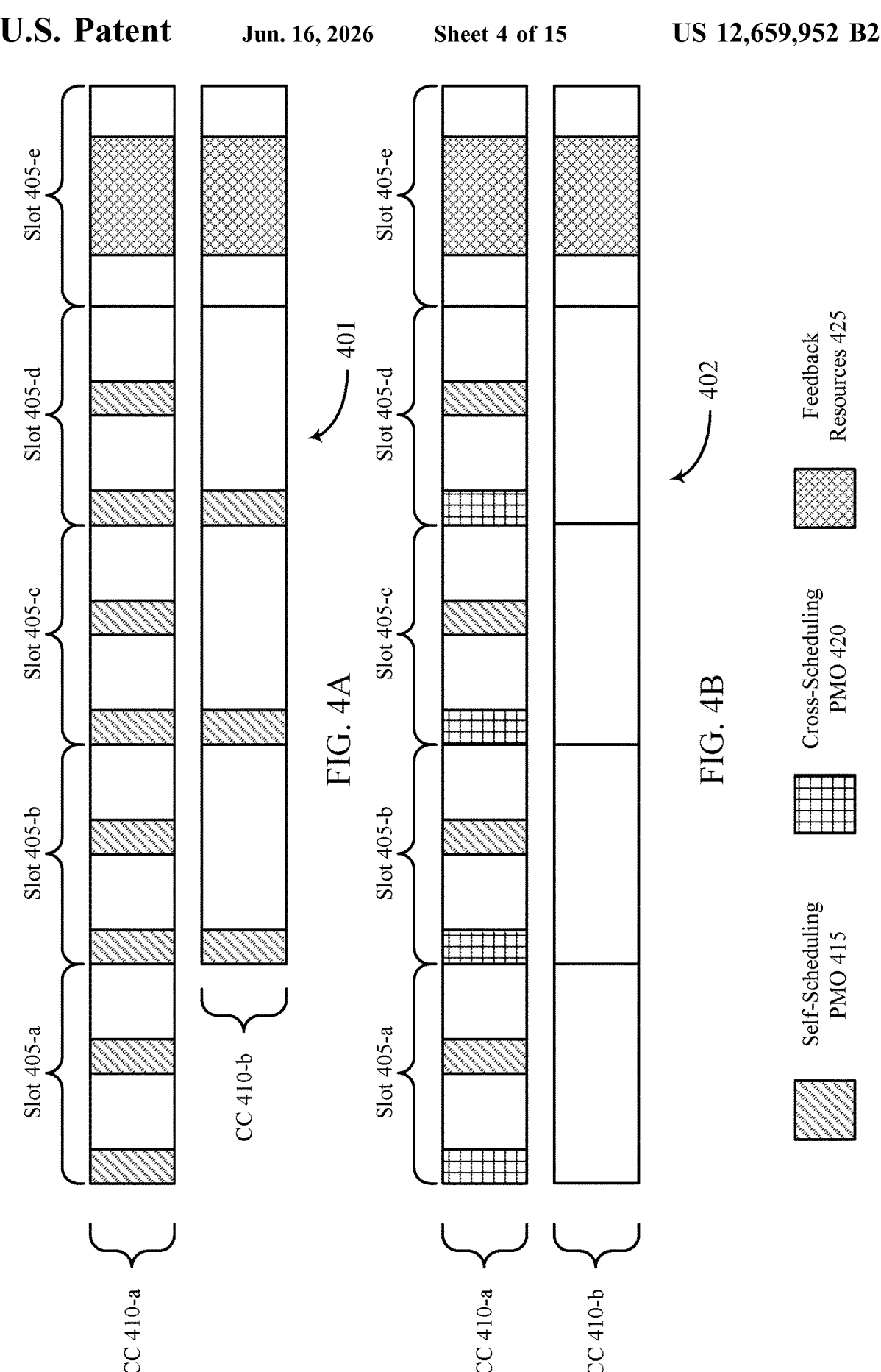
FIGS. 4A and 4B show examples of resource diagrams that support codebook size based on control channel monitoring occasions in accordance with one or more aspects of the present disclosure.

FIGS. 4A and 4B show examples of resource diagrams 401 and 402, respectively, that support codebook size based on control channel monitoring occasions in accordance with one or more aspects of the present disclosure. The resource diagrams 401 and 402 may implement, or be implemented by, one or more aspects of the wireless communications system 100, the wireless communications system 200, and the resource diagram 300. For example, the resource diagrams 401 and 402 may be examples of time-frequency resources allocated for signaling between a network entity 105 and a UE 115, which may be examples of corresponding devices described with reference to FIGS. 1 and 2. In some cases, the resource diagrams 401 and 402 may include a set of candidate time slots 405-*a*, 405-*b*, 405-*c*, and 405-*d*, as well as a feedback time slot 405-*e*, which may be examples of the time slots 305 described with reference to FIG. 3. The resource diagrams 401 and 402 may include a CC 410-*a* and a CC 410-*b*, which may be examples of multiple CCs configured for a UE 115 in a downlink carrier aggregation scheme. In some cases, the candidate time slots 405 may be determined according to a set of possible offset values, $$K_1',$$

according to techniques described with reference to FIG. 3, and $$K_1'$$

may be separate for each of the CC 410-*a* and the CC 410-*b*, or may be common to each of the CC 410-*a* and the CC 410-*b*.

FIG. 4A illustrates an example of the resource diagram 401, which may include a self-scheduling scheme for one or more CCs 410. For example, the CC 410-*a* and the CC 410-*b* may each be configured with one or more self-scheduling PMOs 415 per candidate time slot 405. To communicate feedback associated with a CC 410, the UE 115 may generate a feedback codebook that includes an entry for each self-scheduling PMO 415 configured for the CC 410 (e.g., the UE 115 considers self-scheduling PMOs 415 separately per CC 410). For example, the CC 410-*a* may include two self-scheduling PMOs 415 in each of the time slots 405-*a*, 405-*b*, 405-*c*, and 405-*d*, and the UE 115 may transmit first feedback for the CC 410-*a* (e.g., in the time slot 405-*e* via the feedback resources 425) according to a feedback codebook that includes eight entries (e.g., one entry or bit for each self-scheduled PMO 415 of the CC 410-*a*). As another example, the CC 410-*b* may include one self-scheduling PMO 415 in each of the time slots 405-*b*, 405-*c*, and 405-*d*, and the UE 115 may transmit second feedback for the CC 410-*b* (e.g., in the time slot 405-*e* via the feedback resources 425) according to a feedback codebook that includes three entries (e.g., one entry or bit for each self-scheduled PMO 415 of the CC 410-*b*). In some cases, the UE 115 may transmit a HARQ message that includes both the first feedback and the second feedback. Additionally, the set of possible slot offsets values $$K'_1$$

(e.g., possible slot offsets between a DCI message and the feedback time slot 405-*e*) that are used to determine the associated PMOs may be separate or common for the multiple CCs 410.

FIG. 4B illustrates and example of the resource diagram 402, which may include a cross-carrier scheduling scheme for one or more CCs 410. For example, the CC 410-*a* (e.g., a scheduling CC) may include one or more self-scheduling PMOs 415 and one or more cross-scheduling PMOs 420, which may schedule PDSCH transmissions for both the CC 410-*a* and the CC 410-*b* (e.g., a scheduled CC). To communicate feedback associated with a CC 410, the UE 115 may generate a codebook that includes an entry for each PMO that schedules PDSCH transmissions for the CC 410. For example, the CC 410-*a* may include one self-scheduling PMO 415 and one cross-scheduling PMO 420 in each of the time slots 405-*a*, 405-*b*, 405-*c*, and 405-*d*, and the UE 115 may transmit first feedback for the CC 410-*a* (e.g., in the time slot 405-*e* via the feedback resources 425) according to a codebook that includes eight entries (e.g., one for each self-scheduled PMO 415 and each cross-scheduling PMO 420). As another example, the CC 410-*b* may include no PMOs, but may be scheduled by the cross-scheduling PMOs 420 included in the CC 410-*a*. In such an example, the UE 115 may transmit second feedback for the CC 410-*b* (e.g., in the time slot 405-*e* via the feedback resources 425) according to a codebook that includes four entries (e.g., one entry or bit for each cross-scheduling PMO 420). In some examples, SS sets in the scheduling CC (e.g., the CC 410-*a*) that are configured to schedule the scheduled CC (e.g., the CC 410-*b*) may be considered for feedback associated with the scheduled CC (e.g., SS sets not configured to schedule the scheduled CC are not considered to determine the PMOs associated with the scheduled CC). Additionally, the set of possible slot offsets values $K_1'$ (e.g., possible slot offsets between a DCI message and the feedback time slot 405-*e*) that are used to determine the associated PMOs may be separate or common for the multiple CCs 410.

Figure 5:
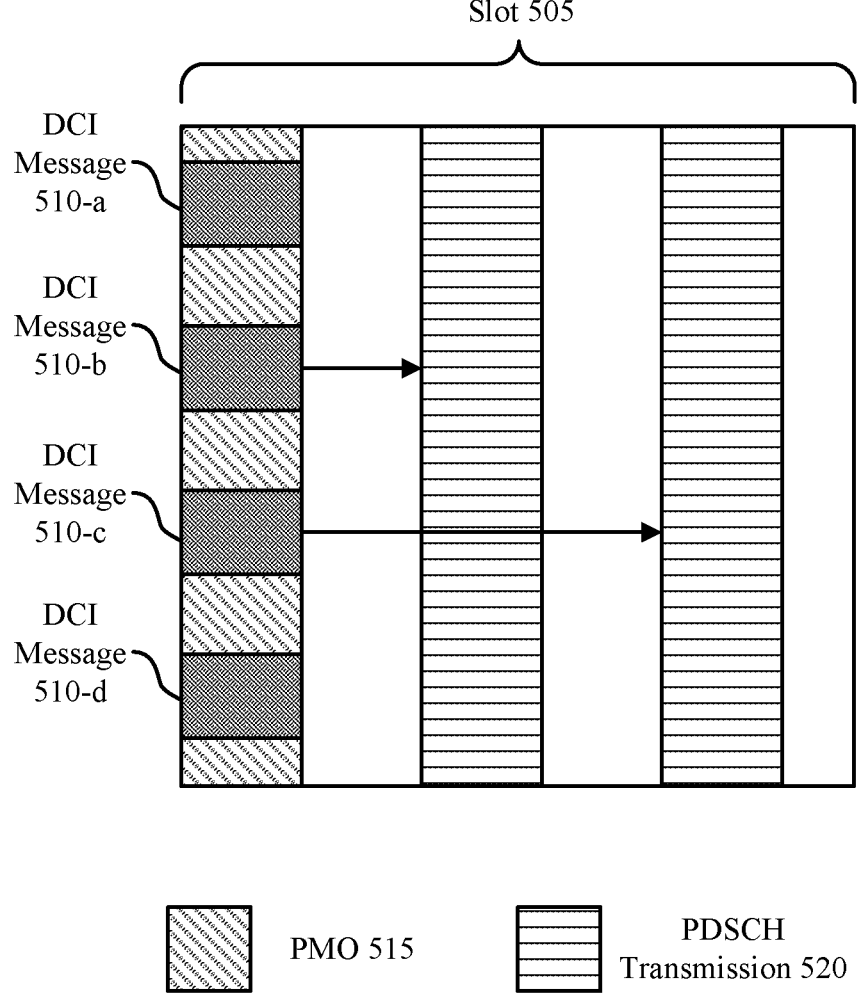
FIG. 5 shows an example of a resource diagram that supports codebook size based on control channel monitoring occasions in accordance with one or more aspects of the present disclosure.

FIG. 5 shows an example of a resource diagram 500 that supports codebook size based on control channel monitoring occasions in accordance with one or more aspects of the present disclosure. The resource diagram 500 may implement, or be implemented by, one or more aspects of the wireless communications system 100, the wireless communications system 200, the resource diagram 300, and the resource diagrams 401 and 402. For example, the resource diagram 500 may be an example of time-frequency resources allocated for signaling between a network entity 105 and a UE 115, which may be examples of corresponding devices described with reference to FIGS. 1 and 2. In some cases, the resource diagram 500 may include a time slot 505, which may be an example of the time slots 305 and the time slots 405 described with reference to FIGS. 3 and 4, respectively.

In some examples, a UE 115 may receive multiple DCI messages 510 during a PMO 515. For example, the UE 115 may receive a DCI message 510-*a*, a DCI message 510-*b*, a DCI message 510-*c*, and a DCI message 510-*d* during the PMO 515 that each schedule transmissions for a same CC and are each associated with feedback. In some cases, the UE 115 may indicate feedback for the multiple DCI messages 510 according to a codebook, which may or may not be a PMO-based codebook.

For example, the UE 115 may generate the feedback codebook for the CC according to a non-PMO based codebook type (e.g., a Type 1 codebook or a Type 2 codebook). In such an example, the UE 115 may concatenate a payload of multiple codebook types (e.g., for multiple different CCs) due to the codebook type being configured per CC (e.g., rather than per cell group). For example, the UE 115 may concatenate a payload of a Type 1 codebook (e.g., corresponding to a first CC) with a payload of a PMO-based codebook (e.g., corresponding to a second CC).

In another example, the UE 115 may generate the feedback codebook to include Nbits per PMO 515 (e.g., per entry of the feedback codebook), where N may correspond to a maximum quantity of DCI messages 510 that may be communicated in the PMO 515. In some cases, the UE 115 may report the value of N to a network entity 105 (e.g., as a capability of the UE 115) or the network entity 105 may configure each scheduled CC with a common or different respective value for N (e.g., via RRC signaling). If the UE 115 monitors the PMO 515 and detects fewer than N DCI messages 510 (e.g., detecting n DCI messages 510, where n<N), the UE 115 may set a first subset of bits (e.g., n bits) in the corresponding entry of the codebook to indicate feedback associated with the received DCI messages 510 and may set a second subset of the bits (e.g., the remaining N−n bits) in the corresponding entry to NACKs. For example, the UE 115 may fail to receive the DCI message 510-*a*, may successfully receive the DCI message 510-*b* (e.g., scheduling a first PDSCH transmission 520), may successfully receive the DCI message 510-*c* (e.g., scheduling a second PDSCH transmission 520), and may fail to receive the DCI message 510-*d*. In such an example, if the UE 115 successfully decodes the first PDSCH transmission 520 and the second PDSCH transmission 520, the UE 115 may indicate NACKs for the DCI message 510-*a* and the DCI message 510-*d* and may indicate ACKs for DCI message 510-*b* and the DCI message 510-*c*.

To indicate which bits of the codebook entry correspond to which DCI messages 510, the PMO 515 may be divided into N frequency regions (e.g., with respect to a corresponding CORESET associated with the UE 115, a start of a control channel element for PDCCH candidates, or both). In some examples, the Nbits of a codebook entry associated with the PMO 515 may correspond to the N frequency regions of the PMO 515 (e.g., where a NACK is inserted for a frequency region if a DCI message 510 is not detected in the frequency region). For example, the UE 115 may configure the codebook entry for the PMO 515 to indicate feedback for the DCI messages 510 in an order according to the frequency regions of the PMO 515 associated with each DCI message 510 (e.g., NACK, ACK, ACK, NACK to indicate feedback for the DCI message 510-*a*, the DCI message 510-*b*, the DCI message 510-*c*, and the DCI message 510-*d*, respectively).

Figure 6:
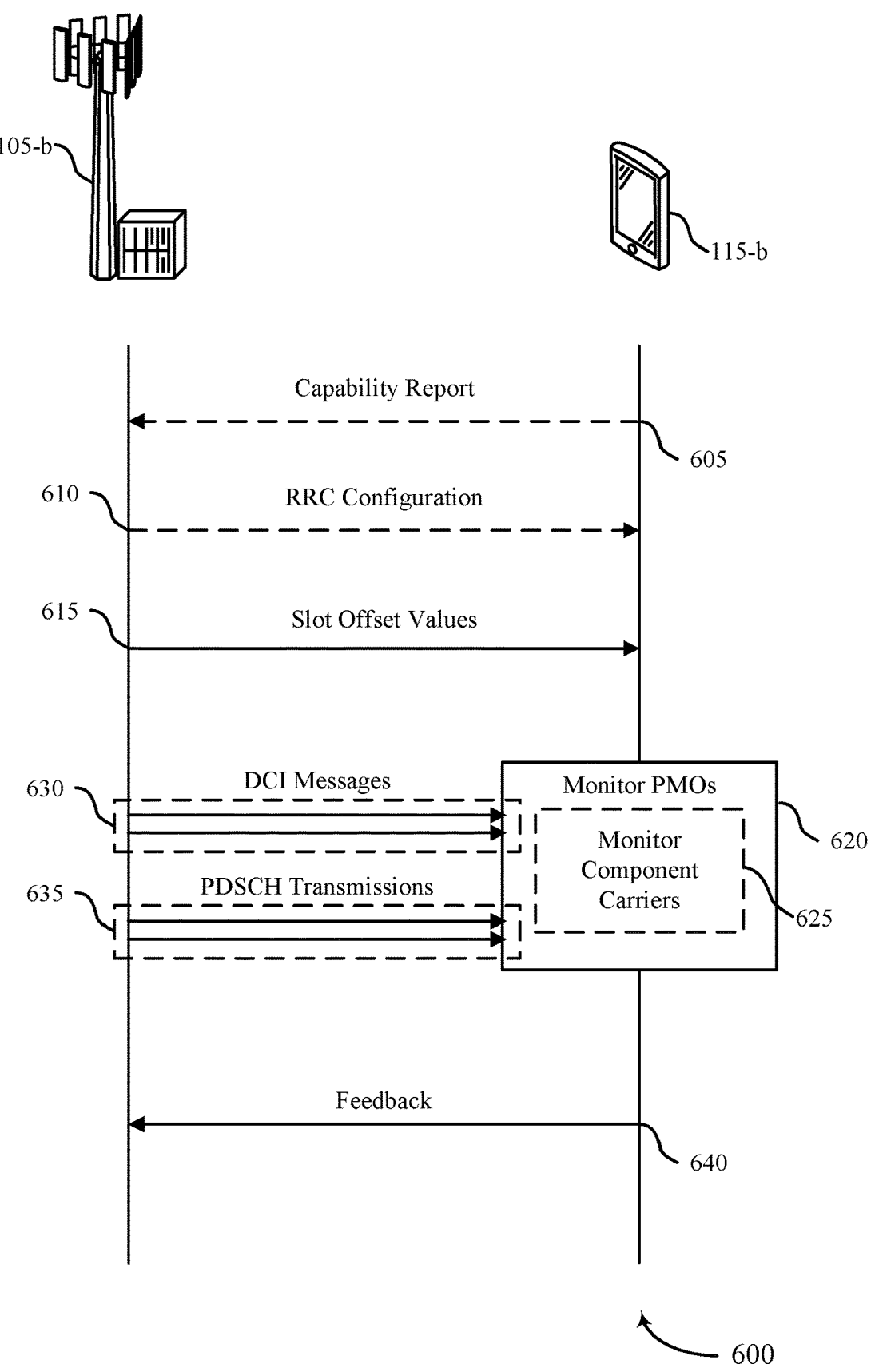
FIG. 6 shows an example of a process flow that supports codebook size based on control channel monitoring occasions in accordance with one or more aspects of the present disclosure.

FIG. 6 shows an example of a process flow 600 that supports codebook size based on control channel monitoring occasions in accordance with one or more aspects of the present disclosure. The process flow 600 may implement, or be implemented by, one or more aspects of the wireless communications systems 100 and 200, as well as the resource diagrams 300, 401, 402, and 500. For example, the process flow 600 may be an example of signaling between a network entity 105-*b* and a UE 115-*b*, which may be examples of corresponding devices described with reference to FIGS. 1 and 2. In some cases, the process flow 600 may support the UE 115-*b* transmitting feedback to the network entity 105-*b* according to a codebook that is sized according to a quantity of PMOs configured for a set of candidate time slots, as described with reference to FIGS. 2 through 5. Alternative examples of the following may be implemented, where some processes are performed in a different order than described or are not performed. In some cases, processes may include additional features not mentioned below, or further processes may be added.

At 605, the UE 115-*b* may transmit, to the network entity 105-*b*, a capability report of the UE 115-*b* indicating one or more capabilities of the UE 115-*b*. For example, the capability report may indicate a capability of the UE 115-*b* to use a first type of feedback codebook that has a first codebook size that corresponds to a quantity of PMOs (e.g., PMOs configured for a set of candidate time slots). Additionally, or alternatively, the capability report may indicate a capability of the UE 115-*b* to receive multiple PDSCH transmissions per time slot, a quantity of DCI messages the UE 115-*b* is capable of processing per time slot, or both.

At 610, the network entity 105-*b* may transmit a configuration to the UE 115-*b* via RRC signaling. In some cases, the configuration may be for the first type of feedback codebook (e.g., indicating to use the first type of feedback codebook). In some examples, the configuration for the first type of feedback codebook may be associated with a cell group of the UE 115-*b* (e.g., a per cell configuration), may be associated with a CC of the UE 115-*b* (e.g., a per CC configuration), or both.

At 615, the network entity 105-*b* may indicate one or more slot offset values to the UE 115-*b*. For example, the network entity 105-*b* may transmit a DCI message including a first set of slot offset values (e.g., k0 values according to a TDRA field) and a second set of slot offset values (e.g., k1 values according to a PDSCH-to-HARQ feedback timing indicator field). In some cases, the first set of slot offset values may indicate one or more possible slot offsets between a DCI message and a PDSCH transmission scheduled by the DCI message and the second set of slot offset values may indicate one or more possible slot offsets between a PDSCH transmission and a corresponding slot for transmitting feedback. As another example, the network entity 105-*b* may transmit a DCI message including a set of multiple slot offset values (e.g., $$K_1'$$

which may indicate possible slot offset values between the DCI message and a corresponding slot of transmitting feedback.

Based on receiving the slot offset values, the UE 115-*b* may determine one or more candidate time slots for monitoring for PMOs. For example, if the UE 115-*b* receives the first set of slot offset values and the second set of slot offset values, the UE 115-*b* may identify the possible slot offset values according to unique values obtained when summing each element of the first set of slot offset values and the second set of slot offset values $$(\text{e.g., } K_1' = k1 + k0).$$

In some cases, the UE 115-*b* may identify at least subset of a set of multiple time slots that occur before a feedback slot based on the possible slot offset values (e.g., relative to the feedback slot).

At 620, the UE 115-*b* may monitor a first set of one or more PMOs within at least the subset of the set of multiple slots (e.g., candidate time slots) that occur before the second time slot. For example, the UE 115-*b* may monitor two PMOs per candidate time slot, and may or may not receive a DCI message during each PMO. In some cases, the UE 115-*b* may configure first feedback according to the first codebook type, where the first codebook size of the first feedback is based on a quantity of PMOs of the first set of one or more PMOs (e.g., each entry of the first feedback corresponding to a respective PMO). In some cases, each PMO of the first set of one or more PMOs may be associated with a DCI format associated with feedback transmission (e.g., DCI format 10, 1_1, or 1_2), and may not overlap with a semi-static uplink symbol (e.g., in a TDD pattern).

At 625, the UE 115-*b* may monitor multiple CCs for PMOs over the set of candidate time slots. For example, the UE 115-*b* may monitor, via a first CC, the first set of one or more PMOs within the subset of the time slots and may monitor, via a second CC, a second set of one or more PMOs. The UE 115-*b* may generate second feedback according to a second codebook size associated with the second CC, where the second codebook size of the second feedback may be based on a second quantity of the second set of one or more PMOs. In such an example, the first CC and the second CC may each be associated with the first set of one or more PMOs and the second set of one or more PMOs, respectively (e.g., self-scheduled CCs).

Additionally, or alternatively, the UE 115-*b* may monitor, via the first CC, the first set of one or more PMOs within the subset of the time slots, and may generate second feedback according to a second codebook size associated with a second CC, where the second codebook size of the second feedback is based at least in part on a second quantity of at least a subset of the first set of one or more PMOs. For example, the first CC may include one or more self-scheduling PMOs (e.g., PMOs that schedule transmissions for the first CC) and one or more cross-carrier scheduling PMOs (e.g., PMOs that schedule transmissions for the first CC and the second CC), and the second codebook size may be based on a quantity of the cross-carrier scheduling PMOs (e.g., associated with scheduling the second CC).

At 630, the network entity 105-*b* may transmit, while the UE 115-*b* monitors PMOs, one or more DCI messages during corresponding PMOs of the first set of one or more PMOs, the second set of one or more PMOs, or a combination thereof. For example, the UE 115-*b* may receive, in a first time slot, a first DCI indicating a second time slot for the UE 115-*b* to transmit feedback. In some cases, a DCI message of the one or more DCI messages may indicate a slot offset value indicating an offset between the DCI message and a PDSCH transmission (e.g., a k0 value) or indicating an offset between the DCI message and the second slot (e.g., a $K_1$ value). In some cases, a DCI message may schedule a PDSCH transmission or may not schedule a PDSCH transmission (e.g., a DCI message related to an SPS release indication, a serving cell dormancy indication, a TCI state change, or the like).

In some cases, the UE 115-*b* may receive, during a first PMO of the first set of one or more PMOs, a second DCI message that does not schedule a data transmission, and may set a first entry of the feedback corresponding to the first PMO to an ACK based on the second DCI message not scheduling a data transmission. In some other cases, the UE 115-*b* may not detect a DCI message during the first PMO, and may set the first entry of the feedback to a NACK based on not receiving a DCI during the first PMO. Additionally, or alternatively, the UE 115-*b* may receive, during the first PMO, the second DCI message that schedules a PDSCH transmission.

At 635, the network entity 105-*b* may transmit, while the UE 115-*b* monitors the PMOs and corresponding PDSCH resources, one or more PDSCH transmissions. For example, the UE 115-*b* may receive a PDSCH transmission scheduled by the second DCI received during the first PMO, and may set a first entry (e.g., corresponding to the first PMO) of the first feedback to an ACK or a NACK according to a decoding result of the PDSCH transmission. Additionally, or alternatively, the UE 115-*b* may receive, within the subset of time slots, one or more PDSCH transmissions not scheduled by a DCI message, such as SPS PDSCH transmissions (e.g., if the UE 115-*b* is activated with one or more SPS configurations). The UE 115-*b* may generate (e.g., separately generate) one or more additional feedback entries corresponding to the one or more SPS PDSCH transmissions and may append the additional feedback entries to the first feedback. In some cases, the additional entries may be generated according to a different codebook type (e.g., a Type 2 codebook).

At 640, the UE 115-*b* may transmit, to the network entity 105-*b* in the second slot, the first feedback, the second feedback, or both. For example, the UE 115-*b* may transmit the first feedback according to the first codebook size (e.g., in response to the first DCI message) and may transmit the second feedback according to the second feedback size (e.g., if the UE 115-*b* monitors multiple CCs). In some cases, each entry (e.g., one or more bits) of the first feedback may correspond to a respective PMO of the first set of one or more PMOs. For example, the first feedback may include a feedback codebook that includes a sequence of entries (e.g., a sequence of one-bit entries) corresponding to the quantity of PMOs occurring before a time slot for reporting the first feedback (e.g., the second time slot). In some examples, the UE 115-*b* may transmit a HARQ message that includes the first feedback wherein the first feedback is a sequence that has a size (e.g., quantity of bits or quantity of entries corresponding to one or more bits) that is the same as the quantity of PMOs that occur before the feedback slot (e.g., slot indicated by DCI that includes HARQ resources). In some examples, each bit in the bit sequence of the first feedback corresponds to a respective PMO of the quantity of PMOs, or is associated with a respective resource scheduled by a respective PMO, or combinations thereof.

In some examples, each entry of the first feedback may include one or more bits. As an example, each entry of the first feedback may include a quantity of bits corresponding to a quantity of codewords (e.g., codewords or TBs) configured for data channel reception by the UE 115-*b*. For example, the quantity of bits may be two bits including a first bit and a second bit, where the first bit and the second bit may each indicate a NACK based on not receiving control information during a corresponding PMO of the first set of one or more PMOs. In another example, the first bit may indicate a decoding result of a first codeword and the second bit may indicate a NACK based on receiving the second DCI message during the corresponding PMO and the second DCI message scheduling a single codeword (e.g., the first codeword). In another example, the first bit may indicate an ACK and second bit may indicate an ACK or a NACK based on receiving the second DCI message during the corresponding PMO and the second DCI message not scheduling a data transmission.

As another example, each entry of the first feedback may include a quantity of bits corresponding to a quantity of CBGs configured for data channel reception by the UE 115-*b*. For example, each bit of the quantity of bits may indicate a NACK based on not receiving control information during a corresponding PMO of the first set of one or more PMOs. In another example, a first subset of the quantity of bits may indicate an ACK or a NACK and second subset of the quantity of bits may indicate a NACK based on receiving the second DCI message during the corresponding PMO and the second DCI message scheduling a second quantity of CBGs (e.g., n CBGs) that is less than the quantity of CBGs (e.g., N CBGs, where n<N) configured for data channel reception by the UE. In another example, a first bit of the quantity of bits may indicate an ACK and one or more remaining bits of the quantity of bits may indicate an ACK or a NACK based on receiving the second DCI message during the corresponding PMO and the second DCI message not scheduling a data transmission.

As another example, each entry of the first feedback codebook may include a quantity of bits corresponding to a quantity of PDSCH transmissions capable of being scheduled by a single DCI message during each PMO of the first set of one or more PMOs. For example, each entry of the first feedback may include Nbits corresponding to N possible PDSCH transmissions per PMO. In some cases, such as when time domain feedback bundling is enabled for the UE 115-*b*, N may be equal to one (e.g., one bit per PMO).

As another example, each entry of the first feedback may include a quantity of bits corresponding to a quantity of DCI messages associated with each PMO of the first set of one or more PMOs. In some cases, the quantity of DCI messages may correspond to a quantity of frequency regions associated with each PMO of the first set of one or more PMOs, where the quantity of frequency regions may be based on a CORESET associated with the UE 115-*b*, a start of a CCE, or both. It is noted that the process flow 600 may repeat one or more times, and the UE 115-*a* may subsequently transmit second feedback (or additional feedback).

Figure 7:
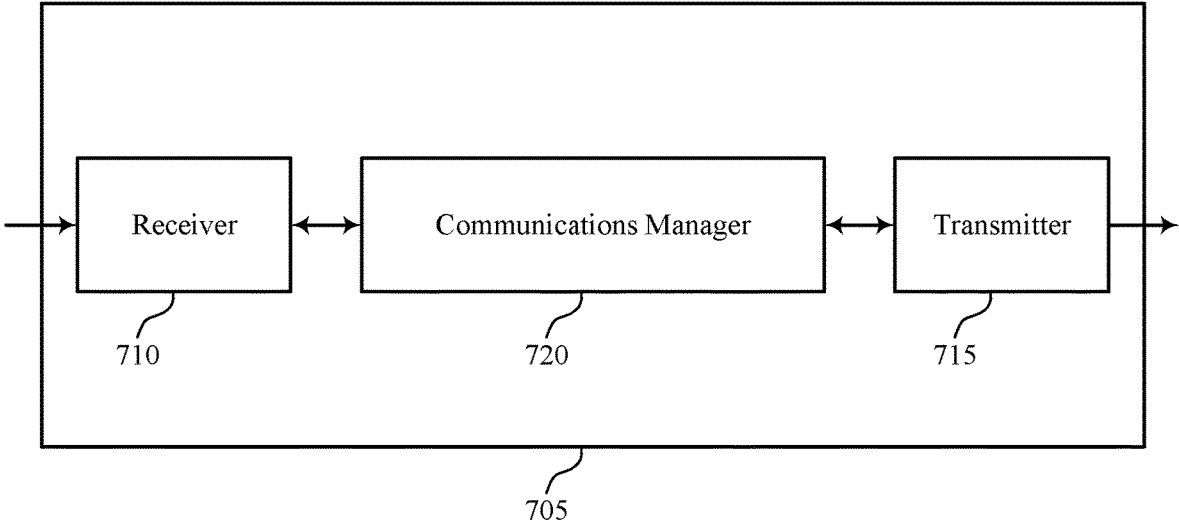
FIGS. 7 and 8 show block diagrams of devices that support codebook size based on control channel monitoring occasions in accordance with one or more aspects of the present disclosure.

FIG. 7 shows a block diagram 700 of a device 705 that supports codebook size based on control channel monitoring occasions in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to codebook size based on control channel monitoring occasions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to codebook size based on control channel monitoring occasions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of codebook size based on control channel monitoring occasions as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 is capable of, configured to, or operable to support a means for receiving, in a first time slot, a first DCI message indicating a second time slot for the UE to transmit feedback according to a codebook size. The communications manager 720 is capable of, configured to, or operable to support a means for monitoring a first set of one or more PMOs within at least a subset of a set of multiple time slots that occur before the second time slot based on the first DCI message. The communications manager 720 is capable of, configured to, or operable to support a means for transmitting first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced signaling overhead by reducing a quantity of bits associated with a feedback codebook.

Figure 8:
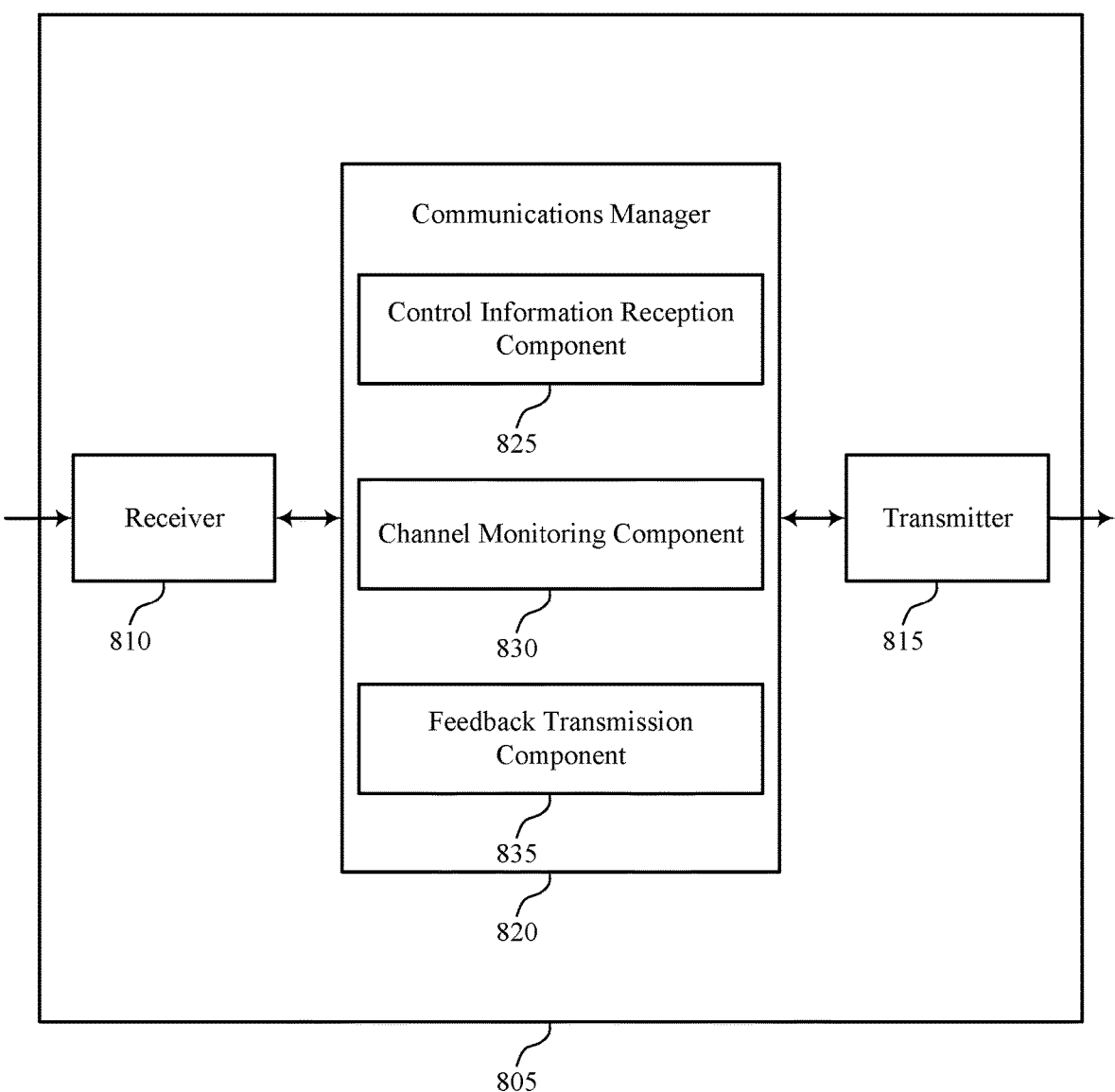

FIG. 8 shows a block diagram 800 of a device 805 that supports codebook size based on control channel monitoring occasions in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to codebook size based on control channel monitoring occasions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to codebook size based on control channel monitoring occasions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of codebook size based on control channel monitoring occasions as described herein. For example, the communications manager 820 may include a control information reception component 825, a channel monitoring component 830, a feedback transmission component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The control information reception component 825 is capable of, configured to, or operable to support a means for receiving, in a first time slot, a first DCI message indicating a second time slot for the UE to transmit feedback according to a codebook size. The channel monitoring component 830 is capable of, configured to, or operable to support a means for monitoring a first set of one or more PMOs within at least a subset of a set of multiple time slots that occur before the second time slot based on the first DCI message. The feedback transmission component 835 is capable of, configured to, or operable to support a means for transmitting first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

Figure 9:
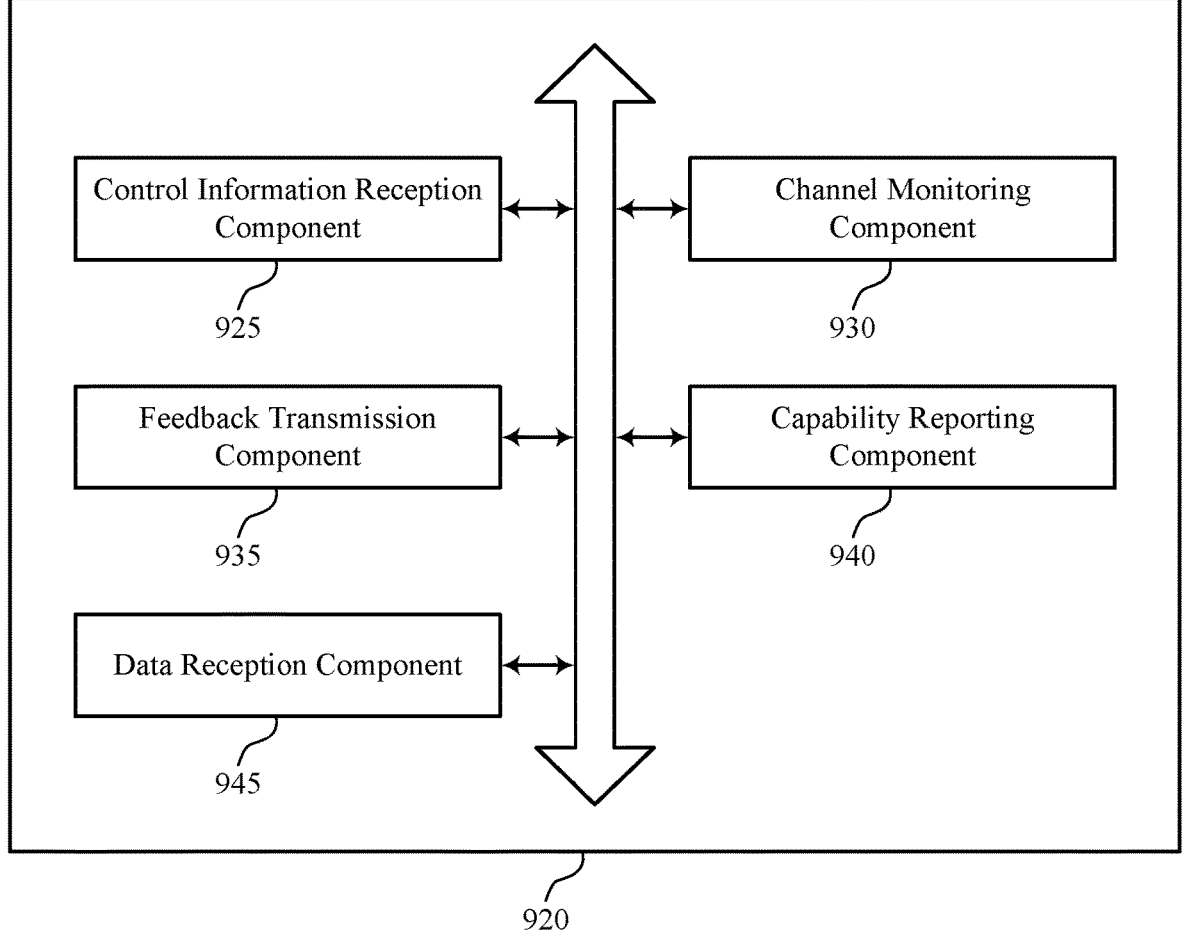
FIG. 9 shows a block diagram of a communications manager that supports codebook size based on control channel monitoring occasions in accordance with one or more aspects of the present disclosure.

FIG. 9 shows a block diagram 900 of a communications manager 920 that supports codebook size based on control channel monitoring occasions in accordance with one or more aspects of the present disclosure. The communications manager 920 may be an example of aspects of a communications manager 720, a communications manager 820, or both, as described herein. The communications manager 920, or various components thereof, may be an example of means for performing various aspects of codebook size based on control channel monitoring occasions as described herein. For example, the communications manager 920 may include a control information reception component 925, a channel monitoring component 930, a feedback transmission component 935, a capability reporting component 940, a data reception component 945, or any combination thereof. Each of these components may communicate, directly or indirectly, with one another (e.g., via one or more buses).

The communications manager 920 may support wireless communications at a UE in accordance with examples as disclosed herein. The control information reception component 925 is capable of, configured to, or operable to support a means for receiving, in a first time slot, a first DCI message indicating a second time slot for the UE to transmit feedback according to a codebook size. The channel monitoring component 930 is capable of, configured to, or operable to support a means for monitoring a first set of one or more PMOs within at least a subset of a set of multiple time slots that occur before the second time slot based on the first DCI message. The feedback transmission component 935 is capable of, configured to, or operable to support a means for transmitting first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

In some examples, to support monitoring the first set of one or more PMOs, the control information reception component 925 is capable of, configured to, or operable to support a means for receiving, during a first PMO of the first set of one or more PMOs, a second DCI message that schedules a PDSCH transmission, where a first entry of the first feedback indicates an ACK or a NACK according to a decoding result of the PDSCH transmission, the first entry corresponding to the first PMO.

In some examples, to support monitoring the first set of one or more PMOs, the control information reception component 925 is capable of, configured to, or operable to support a means for receiving, during a first PMO of the first set of one or more PMOs, a second DCI message, where a first entry of the first feedback indicates an ACK based on the second DCI message not scheduling a data transmission, the first entry corresponding to the first PMO.

In some examples, a first entry of the first feedback indicates a NACK based on not receiving control information during a first PMO of the first set of PMOs, the first entry corresponding to the first PMO.

In some examples, each PMO of the first set of one or more PMOs does not overlap with a semi-static uplink symbol in a TDD pattern.

In some examples, each PMO of the first set of one or more PMOs is associated with a DCI format associated with feedback transmission.

In some examples, the capability reporting component 940 is capable of, configured to, or operable to support a means for transmitting a capability report indicating a capability of the UE to use a first type of feedback codebook that has the first codebook size that corresponds to a quantity of PMOs, where the first feedback is in accordance with the first type of feedback codebook. In some examples, the control information reception component 925 is capable of, configured to, or operable to support a means for receiving, based on transmitting the capability report, RRC signaling indicating a configuration for the first type of feedback codebook, where the configuration is associated with a cell group of the UE, a CC of the UE, or both.

In some examples, the control information reception component 925 is capable of, configured to, or operable to support a means for receiving control information indicating a first set of slot offset values and a second set of slot offset values, where the subset of the set of multiple time slots is based on the first set of slot offset values and the second set of slot offset values.

In some examples, the control information reception component 925 is capable of, configured to, or operable to support a means for receiving an indication of a set of multiple slot offset values, where the first set of one or more PMOs within at least the subset of the set of multiple time slots that occur before the second time slot is based on the set of multiple slot offset values.

In some examples, the control information reception component 925 is capable of, configured to, or operable to support a means for receiving, during a first PMO of the first set of one or more PMOs, a second DCI message that schedules a physical downlink control channel transmission and indicates a first slot offset value of the set of multiple slot offset values, the first slot offset value indicating a quantity of time slots between a third time slot associated with the first PMO and the second time slot.

In some examples, the channel monitoring component 930 is capable of, configured to, or operable to support a means for monitoring, via a first CC, the first set of one or more PMOs within at least the subset of the set of multiple time slots. In some examples, the channel monitoring component 930 is capable of, configured to, or operable to support a means for monitoring, via a second CC, a second set of one or more PMOs. In some examples, the feedback transmission component 935 is capable of, configured to, or operable to support a means for transmitting, in the second time slot, the first feedback associated with the first CC and a second feedback according to a second codebook size associated with the second CC, where the second codebook size of the second feedback is based on a second quantity of the second set of one or more PMOs.

In some examples, the channel monitoring component 930 is capable of, configured to, or operable to support a means for monitoring, via a first CC, the first set of one or more PMOs within at least the subset of the set of multiple time slots. In some examples, the feedback transmission component 935 is capable of, configured to, or operable to support a means for transmitting, in the second time slot, the first feedback associated with the first CC and a second feedback according to a second codebook size associated with a second CC, where the second codebook size of the second feedback is based on a second quantity of at least a subset of the first set of one or more PMOs associated with scheduling the second CC.

In some examples, each entry of the first feedback includes a quantity of bits corresponding to a quantity of codewords configured for data channel reception by the UE.

In some examples, the first bit and the second bit each indicate NACK based on not receiving control information during a corresponding PMO of the first set of one or more PMOs; or the first bit indicates a decoding result of a first codeword and the second bit indicates a NACK based on receiving a second DCI message during the corresponding PMO and the second DCI message scheduling a single codeword, the single codeword including the first codeword; or the first bit indicates an ACK and second bit indicates an ACK or a NACK based on receiving the second DCI message during the corresponding PMO and the second DCI message not scheduling a data transmission.

In some examples, each entry of the first feedback includes a quantity of bits corresponding to a quantity of CBGs configured for data channel reception by the UE.

In some examples, each bit of the quantity of bits indicates a NACK based on not receiving control information during a corresponding PMO of the first set of one or more PMOs; or a first subset of the quantity of bits indicates an ACK or a NACK and second subset of the quantity of bits indicates a NACK based on receiving a second DCI message during the corresponding PMO and the second DCI message scheduling a second quantity of CBGs that is less than the quantity of CBGs configured for data channel reception by the UE; or a first bit of the quantity of bits indicates an acknowledgment and one or more remaining bits of the quantity of bits indicates an ACK or a NACK based on receiving the second DCI message during the corresponding PMO and the second DCI message not scheduling a data transmission.

In some examples, the data reception component 945 is capable of, configured to, or operable to support a means for receiving, within the subset of the set of multiple time slots, one or more PDSCH transmissions, where one or more entries are appended to the first feedback, and where each entry of the one or more entries corresponds to a respective PDSCH transmission of the one or more PDSCH transmissions.

In some examples, the one or more entries are appended to the first feedback based on the one or more PDSCH transmissions being semi-persistently scheduled.

In some examples, each entry of the first feedback includes a quantity of bits corresponding to a quantity of PDSCH transmissions capable of being scheduled by a single DCI message during each PMO of the first set of one or more PMOs. In some examples, only a single downlink DCI may be received per PMO.

In some examples, the quantity of bits is equal to one based on time domain feedback bundling being enabled for the UE.

In some examples, each entry of the first feedback includes a quantity of bits corresponding to a quantity of DCI messages associated with each PMO of the first set of one or more PMOs.

In some examples, the quantity of DCI messages corresponds to a quantity of frequency regions associated with each PMO of the first set of PMOs, the quantity of frequency regions based on a control resource set associated with the UE, a start of a control channel element, or both.

Figure 10:
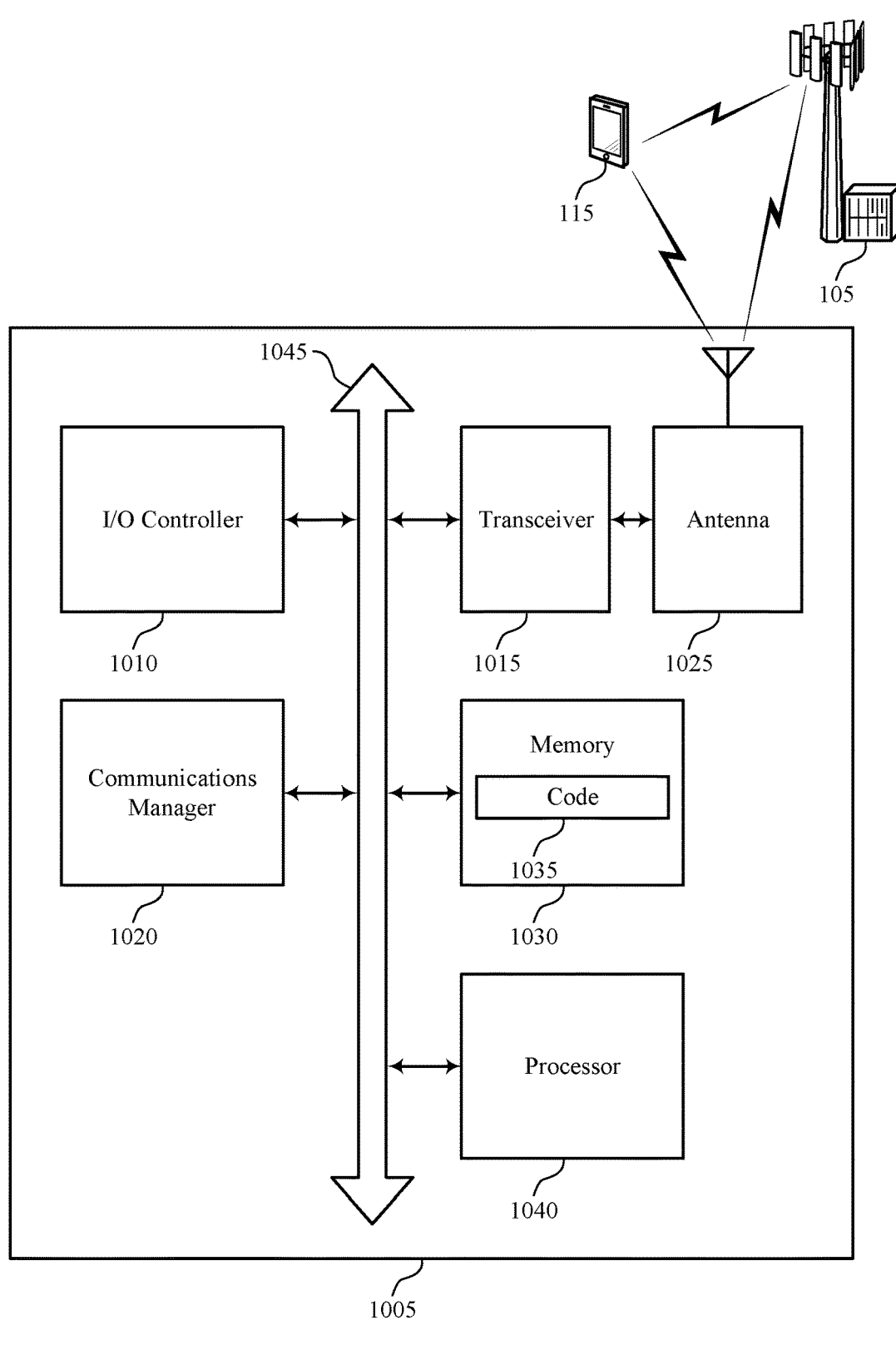
FIG. 10 shows a diagram of a system including a device that supports codebook size based on control channel monitoring occasions in accordance with one or more aspects of the present disclosure.

FIG. 10 shows a diagram of a system 1000 including a device 1005 that supports codebook size based on control channel monitoring occasions in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting codebook size based on control channel monitoring occasions). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 is capable of, configured to, or operable to support a means for receiving, in a first time slot, a first DCI message indicating a second time slot for the UE to transmit feedback according to a codebook size. The communications manager 1020 is capable of, configured to, or operable to support a means for monitoring a first set of one or more PMOs within at least a subset of a set of multiple time slots that occur before the second time slot based on the first DCI message. The communications manager 1020 is capable of, configured to, or operable to support a means for transmitting first feedback according to a first codebook size in the second time slot in response to the first DCI message, where the first codebook size of the first feedback is based on a first quantity of the first set of one or more PMOs that occur within at least the subset of the set of multiple time slots, and where each entry of the first feedback corresponds to a respective PMO of the first set of one or more PMOs.

By including or configuring the communications manager 1020 in accordance with examples as described herein, the device 1005 may support techniques for reduced signaling overhead by reducing a quantity of bits associated with a feedback codebook.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of codebook size based on control channel monitoring occasions as described herein, or the processor 1040 and the memory 1030 may be otherwise configured to perform or support such operations.

Figure 11:
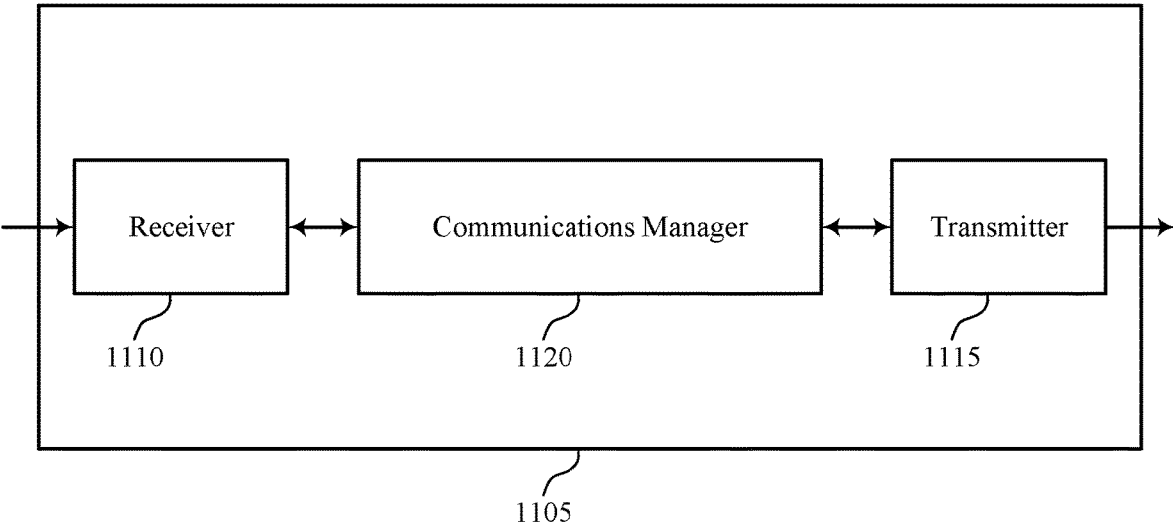
FIGS. 11 and 12 show block diagrams of devices that support codebook size based on control channel monitoring occasions in accordance with one or more aspects of the present disclosure.

FIG. 11 shows a block diagram 1100 of a device 1105 that supports codebook size based on control channel monitoring occasions in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of codebook size based on control channel monitoring occasions as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 is capable of, configured to, or operable to support a means for transmitting, in a first time slot, a first DCI message indicating a second time slot for a UE to transmit feedback according to a codebook size. The communications manager 1120 is capable of, configured to, or operable to support a means for receiving first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced signaling overhead by reducing a quantity of bits associated with a feedback codebook.

Figure 12:
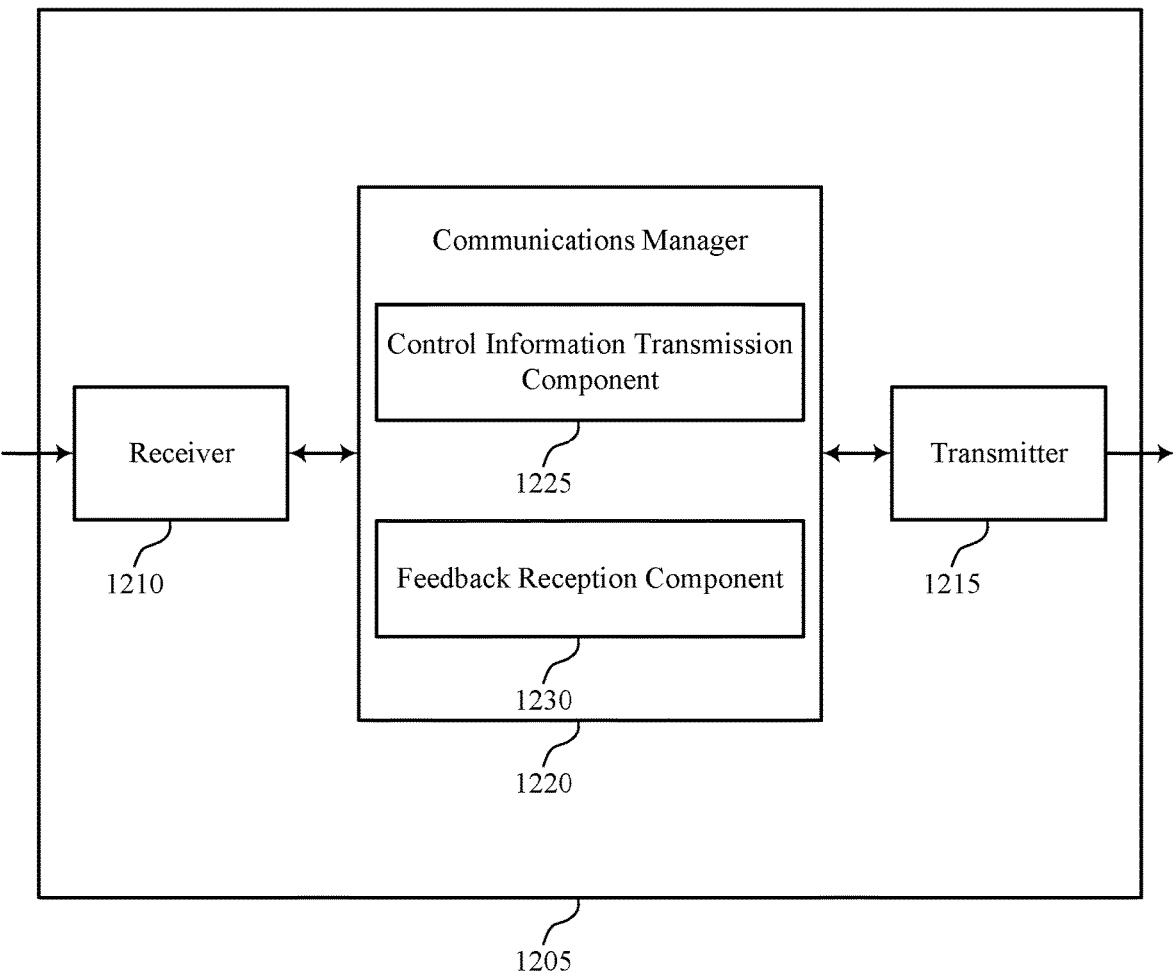

FIG. 12 shows a block diagram 1200 of a device 1205 that supports codebook size based on control channel monitoring occasions in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of codebook size based on control channel monitoring occasions as described herein. For example, the communications manager 1220 may include a control information transmission component 1225 a feedback reception component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The control information transmission component 1225 is capable of, configured to, or operable to support a means for transmitting, in a first time slot, a first DCI message indicating a second time slot for a UE to transmit feedback according to a codebook size. The feedback reception component 1230 is capable of, configured to, or operable to support a means for receiving first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

Figure 13:
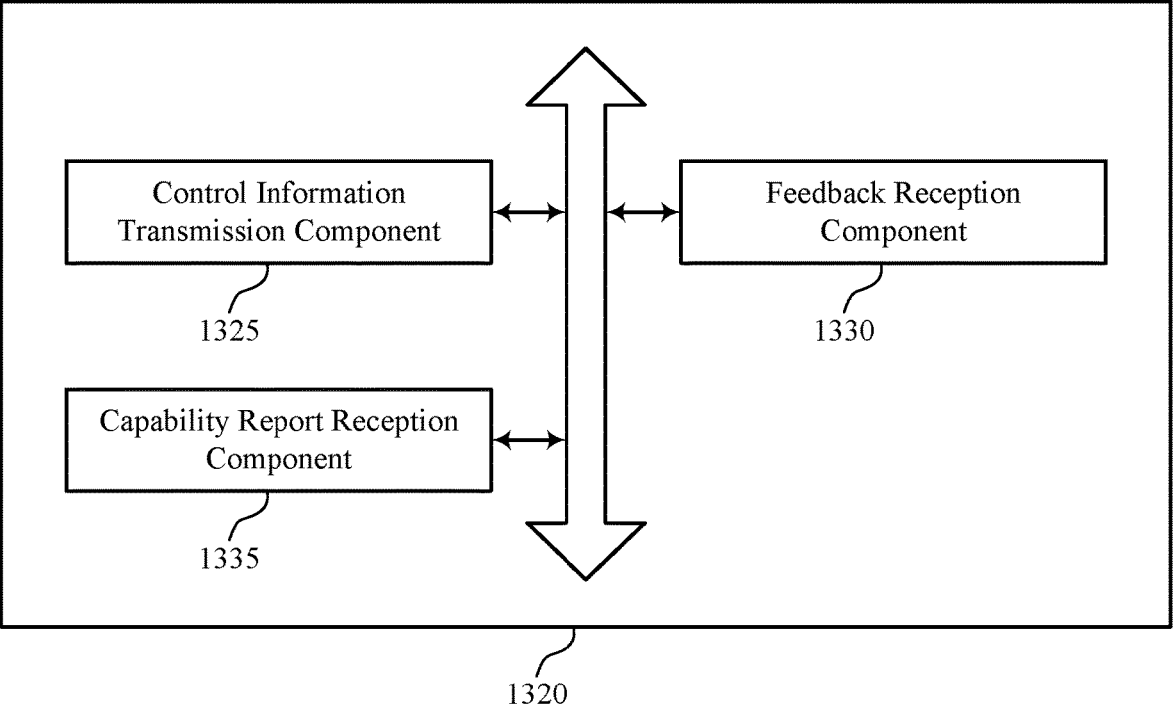
FIG. 13 shows a block diagram of a communications manager that supports codebook size based on control channel monitoring occasions in accordance with one or more aspects of the present disclosure.
Figure 13:

FIG. 13 shows a block diagram 1300 of a communications manager 1320 that supports codebook size based on control channel monitoring occasions in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of codebook size based on control channel monitoring occasions as described herein. For example, the communications manager 1320 may include a control information transmission component 1325, a feedback reception component 1330, a capability report reception component 1335, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The control information transmission component 1325 is capable of, configured to, or operable to support a means for transmitting, in a first time slot, a first DCI message indicating a second time slot for a UE to transmit feedback according to a codebook size. The feedback reception component 1330 is capable of, configured to, or operable to support a means for receiving first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

In some examples, the capability report reception component 1335 is capable of, configured to, or operable to support a means for receiving a capability report indicating a capability of the UE to use a first type of feedback codebook that has the first codebook size that corresponds to a quantity of PMOs, where the first feedback is in accordance with the first type of feedback codebook. In some examples, the control information transmission component 1325 is capable of, configured to, or operable to support a means for transmitting, based on receiving the capability report, RRC signaling indicating a configuration for the first type of feedback codebook, where the configuration is associated with a cell group of the UE, a CC of the UE, or both.

In some examples, the control information transmission component 1325 is capable of, configured to, or operable to support a means for transmitting control information indicating a first set of slot offset values and a second set of offset values, where the subset of the set of multiple time slots is based on the first set of slot offset values and the second set of slot offset values.

In some examples, the control information transmission component 1325 is capable of, configured to, or operable to support a means for transmitting an indication of a set of multiple slot offset values, where the first set of one or more PMOs within at least the subset of the set of multiple time slots that occur before the second time slot is based on the set of multiple slot offset values.

In some examples, the control information transmission component 1325 is capable of, configured to, or operable to support a means for transmitting, during a first PMO of the first set of one or more PMOs, a second DCI message that schedules a physical downlink control channel transmission and indicates a first slot offset value of the set of multiple slot offset values, the first slot offset value indicating a quantity of time slots between a third time slot associated with the first PMO and the second time slot.

In some examples, the feedback reception component 1330 is capable of, configured to, or operable to support a means for receiving, in the second time slot, the first feedback associated with a first CC and a second feedback according to a second codebook size associated with a second CC, where the second codebook size of the second feedback is based on a second quantity of a second set of one or more PMOs associated with the second CC.

Figure 14:
FIG. 14 shows a diagram of a system including a device that supports codebook size based on control channel monitoring occasions in accordance with one or more aspects of the present disclosure.

FIG. 14 shows a diagram of a system 1400 including a device 1405 that supports codebook size based on control channel monitoring occasions in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting codebook size based on control channel monitoring occasions). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 is capable of, configured to, or operable to support a means for transmitting, in a first time slot, a first DCI message indicating a second time slot for a UE to transmit feedback according to a codebook size. The communications manager 1420 is capable of, configured to, or operable to support a means for receiving first feedback according to a first codebook size in the second time slot based on the first DCI message, where the first codebook size of the first feedback is based on a first quantity of a first set of one or more PMOs that occur within at least a subset of a set of multiple time slots that occur before the second time slot, and where each entry of the first feedback corresponds to a respective PMO of the first set of one or more PMOs.

By including or configuring the communications manager 1420 in accordance with examples as described herein, the device 1405 may support techniques for reduced signaling overhead by reducing a quantity of bits associated with a feedback codebook.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of codebook size based on control channel monitoring occasions as described herein, or the processor 1435 and the memory 1425 may be otherwise configured to perform or support such operations.

FIG. 15 shows a flowchart illustrating a method 1500 that supports codebook size based on control channel monitoring occasions in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving, in a first time slot, a first DCI message indicating a second time slot for the UE to transmit feedback according to a codebook size. The operations of 1505 may be performed in accordance with examples as disclosed herein. In some examples, aspects of the operations of 1505 may be performed by a control information reception component 925 as described with reference to FIG. 9.

At 1510, the method may include monitoring a first set of one or more PMOs within at least a subset of a set of multiple time slots that occur before the second time slot based on the first DCI message. The operations of 1510 may be performed in accordance with examples as disclosed herein. In some examples, aspects of the operations of 1510 may be performed by a channel monitoring component 930 as described with reference to FIG. 9.

At 1515, the method may include transmitting first feedback according to a first codebook size in the second time slot in response to the first DCI message, where the first codebook size of the first feedback is based on a first quantity of the first set of the set of multiple time slots, and where each entry of the first feedback corresponds to a respective PMO of the first set of one or more PMOs. The operations of 1515 may be performed in accordance with examples as disclosed herein. In some examples, aspects of the operations of 1515 may be performed by a feedback transmission component 935 as described with reference to FIG. 9.

The following provides an overview of aspects of the present disclosure:

Aspect 1: A method for wireless communications at a UE, comprising: receiving, in a first time slot, a first DCI message indicating a second time slot for the UE to transmit feedback according to a codebook size; monitoring a first set of one or more PMOs within at least a subset of a plurality of time slots that occur before the second time slot based at least in part on the first DCI message; and transmitting first feedback according to a first codebook size in the second time slot in response to the first DCI message, wherein the first codebook size of the first feedback is based at least in part on a first quantity of the first set of one or more PMOs that occur within at least the subset of the plurality of time slots, and wherein each entry of the first feedback corresponds to a respective PMO of the first set of one or more PMOs.

Aspect 2: The method of aspect 1, wherein monitoring the first set of one or more PMOs comprises: receiving, during a first PMO of the first set of one or more PMOs, a second DCI message that schedules a PDSCH transmission, wherein a first entry of the first feedback indicates an ACK or a NACK according to a decoding result of the PDSCH transmission, the first entry corresponding to the first PMO.

Aspect 3: The method of any of aspects 1 through 2, wherein monitoring the first set of one or more PMOs comprises: receiving, during a first PMO of the first set of one or more PMOs, a second DCI message, wherein a first entry of the first feedback indicates an ACK based at least in part on the second DCI message not scheduling a data transmission, the first entry corresponding to the first PMO.

Aspect 4: The method of any of aspects 1 through 3, wherein a first entry of the first feedback indicates a NACK based at least in part on not receiving control information during a first PMO of the first set of PMOs, the first entry corresponding to the first PMO.

Aspect 5: The method of any of aspects 1 through 4, wherein each PMO of the first set of one or more PMOs does not overlap with a semi-static uplink symbol in a TDD pattern.

Aspect 6: The method of any of aspects 1 through 5, wherein each PMO of the first set of one or more PMOs is associated with a DCI format associated with feedback transmission.

Aspect 7: The method of any of aspects 1 through 6, further comprising: transmitting a capability report indicating a capability of the UE to use a first type of feedback codebook that has the first codebook size that corresponds to a quantity of PMOs, wherein the first feedback is in accordance with the first type of feedback codebook; and receiving, based at least in part on transmitting the capability report, RRC signaling indicating a configuration for the first type of feedback codebook, wherein the configuration is associated with a cell group of the UE, a CC of the UE, or both.

Aspect 8: The method of any of aspects 1 through 7, further comprising: receiving control information indicating a first set of slot offset values and a second set of slot offset values, wherein the subset of the plurality of time slots is based at least in part on the first set of slot offset values and the second set of slot offset values.

Aspect 9: The method of any of aspects 1 through 7, further comprising: receiving an indication of a plurality of slot offset values, wherein the first set of one or more PMOs within at least the subset of the plurality of time slots that occur before the second time slot is based at least in part on the plurality of slot offset values.

Aspect 10: The method of aspect 9, further comprising: receiving, during a first PMO of the first set of one or more PMOs, a second DCI message that schedules a physical downlink control channel transmission and indicates a first slot offset value of the plurality of slot offset values, the first slot offset value indicating a quantity of time slots between a third time slot associated with the first PMO and the second time slot.

Aspect 11: The method of any of aspects 1 through 10, further comprising: monitoring, via a first CC, the first set of one or more PMOs within at least the subset of the plurality of time slots; monitoring, via a second CC, a second set of one or more PMOs; and transmitting, in the second time slot, the first feedback associated with the first CC and a second feedback according to a second codebook size associated with the second CC, wherein the second codebook size of the second feedback is based at least in part on a second quantity of the second set of one or more PMOs.

Aspect 12: The method of any of aspects 1 through 10, further comprising: monitoring, via a first CC, the first set of one or more PMOs within at least the subset of the plurality of time slots; and transmitting, in the second time slot, the first feedback associated with the first CC and a second feedback according to a second codebook size associated with a second CC, wherein the second codebook size of the second feedback is based at least in part on a second quantity of at least a subset of the first set of one or more PMOs associated with scheduling the second CC.

Aspect 13: The method of any of aspects 1 through 12, wherein each entry of the first feedback comprises a quantity of bits corresponding to a quantity of codewords configured for data channel reception by the UE.

Aspect 14: The method of aspect 13, wherein the quantity of bits is two bits comprising a first bit and a second bit, and wherein the first bit and the second bit each indicate NACK based at least in part on not receiving control information during a corresponding PMO of the first set of one or more PMOs; or the first bit indicates a decoding result of a first codeword and the second bit indicates a NACK based at least in part on receiving a second DCI message during the corresponding PMO and the second DCI message scheduling a single codeword, the single codeword comprising the first codeword; or the first bit indicates an ACK and second bit indicates an ACK or a NACK based at least in part on receiving the second DCI message during the corresponding PMO and the second DCI message not scheduling a data transmission.

Aspect 15: The method of any of aspects 1 through 14, wherein each entry of the first feedback comprises a quantity of bits corresponding to a quantity of CBGs configured for data channel reception by the UE.

Aspect 16: The method of aspect 15, wherein each bit of the quantity of bits indicates a NACK based at least in part on not receiving control information during a corresponding PMO of the first set of one or more PMOs; or a first subset of the quantity of bits indicates an ACK or a NACK and second subset of the quantity of bits indicates a NACK based at least in part on receiving a second DCI message during the corresponding PMO and the second DCI message scheduling a second quantity of CBGs that is less than the quantity of CBGs configured for data channel reception by the UE;

or a first bit of the quantity of bits indicates an acknowledgment and one or more remaining bits of the quantity of bits indicates an ACK or a NACK based at least in part on receiving the second DCI message during the corresponding PMO and the second DCI message not scheduling a data transmission.

Aspect 17: The method of any of aspects 1 through 16, further comprising: receiving, within the subset of the plurality of time slots, one or more PDSCH transmissions, wherein one or more entries are appended to the first feedback, and wherein each entry of the one or more entries corresponds to a respective PDSCH transmission of the one or more PDSCH transmissions.

Aspect 18: The method of aspect 17, wherein the one or more entries are appended to the first feedback based at least in part on the one or more PDSCH transmissions being semi-persistently scheduled.

Aspect 19: The method of any of aspects 1 through 18, wherein each entry of the first feedback comprises a quantity of bits corresponding to a quantity of PDSCH transmissions capable of being scheduled by a single DCI message during each PMO of the first set of one or more PMOs.

Aspect 20: The method of aspect 19, wherein the quantity of bits is equal to one based at least in part on time domain feedback bundling being enabled for the UE.

Aspect 21: The method of any of aspects 1 through 20, wherein each entry of the first feedback comprises a quantity of bits corresponding to a quantity of DCI messages associated with each PMO of the first set of one or more PMOs.

Aspect 22: The method of aspect 21, wherein the quantity of DCI messages corresponds to a quantity of frequency regions associated with each PMO of the first set of PMOs, the quantity of frequency regions based at least in part on a control resource set associated with the UE, a start of a control channel element, or both.

Aspect 23: A method for wireless communications at a network entity, comprising: transmitting, in a first time slot, a first DCI message indicating a second time slot for a UE to transmit feedback according to a codebook size; and receiving first feedback according to a first codebook size in the second time slot based at least in part on the first DCI message, wherein the first codebook size of the first feedback is based at least in part on a first quantity of a first set of one or more PMOs that occur within at least a subset of a plurality of time slots that occur before the second time slot, and wherein each entry of the first feedback corresponds to a respective PMO of the first set of one or more PMOs.

Aspect 24: The method of aspect 23, further comprising: receiving a capability report indicating a capability of the UE to use a first type of feedback codebook that has the first codebook size that corresponds to a quantity of PMOs, wherein the first feedback is in accordance with the first type of feedback codebook; and transmitting, based at least in part on receiving the capability report, RRC signaling indicating a configuration for the first type of feedback codebook, wherein the configuration is associated with a cell group of the UE, a CC of the UE, or both.

Aspect 25: The method of any of aspects 23 through 24, further comprising: transmitting control information indicating a first set of slot offset values and a second set of offset values, wherein the subset of the plurality of time slots is based at least in part on the first set of slot offset values and the second set of slot offset values.

Aspect 26: The method of any of aspects 23 through 24, further comprising: transmitting an indication of a plurality of slot offset values, wherein the first set of one or more PMOs within at least the subset of the plurality of time slots that occur before the second time slot is based at least in part on the plurality of slot offset values.

Aspect 27: The method of aspect 26, further comprising: transmitting, during a first PMO of the first set of one or more PMOs, a second DCI message that schedules a physical downlink control channel transmission and indicates a first slot offset value of the plurality of slot offset values, the first slot offset value indicating a quantity of time slots between a third time slot associated with the first PMO and the second time slot.

Aspect 28: The method of any of aspects 23 through 27, further comprising: receiving, in the second time slot, the first feedback associated with a first CC and a second feedback according to a second codebook size associated with a second CC, wherein the second codebook size of the second feedback is based at least in part on a second quantity of a second set of one or more PMOs associated with the second CC.

Aspect 29: An apparatus for wireless communications at a UE, comprising a processor; memory coupled with the processor; and instructions stored in the memory and executable by the processor to cause the apparatus to perform a method of any of aspects 1 through 22.

Aspect 30: An apparatus for wireless communications at a UE, comprising at least one means for performing a method of any of aspects 1 through 22.

Aspect 31: A non-transitory computer-readable medium storing code for wireless communications at a UE, the code comprising instructions executable by a processor to perform a method of any of aspects 1 through 22.

Aspect 32: An apparatus for wireless communications at a network entity, comprising a processor; memory coupled with the processor; and instructions stored in the memory and executable by the processor to cause the apparatus to perform a method of any of aspects 23 through 28.

Aspect 33: An apparatus for wireless communications at a network entity, comprising at least one means for performing a method of any of aspects 23 through 28.

Aspect 34: A non-transitory computer-readable medium storing code for wireless communications at a network entity, the code comprising instructions executable by a processor to perform a method of any of aspects 23 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
one or more processors;
memory coupled with the one or more processors; and
instructions stored in the memory and executable by the one or more processors to:
receive, in a first time slot, a first downlink control information message indicating a second time slot for the UE to transmit feedback according to a codebook size;
monitor a first set of one or more physical downlink control channel monitoring occasions within at least a subset of a plurality of time slots that occur before the second time slot based at least in part on the first downlink control information message; and
transmit first feedback according to a first codebook size in the second time slot in response to the first downlink control information message, wherein the first codebook size of the first feedback is based at least in part on a first quantity of the first set of one or more physical downlink control channel monitoring occasions that occur within at least the subset of the plurality of time slots, and wherein each entry of the first feedback corresponds to a respective physical downlink control channel monitoring occasion of the first set of one or more physical downlink control channel monitoring occasions.

2. The UE of claim 1, wherein the instructions to monitor the first set of one or more physical downlink control channel monitoring occasions are executable by the one or more processors to:
receive, during a first physical downlink control channel monitoring occasion of the first set of one or more physical downlink control channel monitoring occasions, a second downlink control information message that schedules a physical downlink shared channel transmission, wherein a first entry of the first feedback indicates an acknowledgement or a negative acknowledgement according to a decoding result of the physical downlink shared channel transmission, the first entry corresponding to the first physical downlink control channel monitoring occasion.

3. The UE of claim 1, wherein the instructions to monitor the first set of one or more physical downlink control channel monitoring occasions are executable by the one or more processors to:
receive, during a first physical downlink control channel monitoring occasion of the first set of one or more physical downlink control channel monitoring occasions, a second downlink control information message, wherein a first entry of the first feedback indicates an acknowledgement based at least in part on the second downlink control information message not scheduling a data transmission, the first entry corresponding to the first physical downlink control channel monitoring occasion.

4. The UE of claim 1, wherein a first entry of the first feedback indicates a negative acknowledgement based at least in part on not receiving control information during a first physical downlink control channel monitoring occasion of the first set of one or more physical downlink control channel monitoring occasions, the first entry corresponding to the first physical downlink control channel monitoring occasion.

5. The UE of claim 1, wherein each physical downlink control channel monitoring occasion of the first set of one or more physical downlink control channel monitoring occasions does not overlap with a semi-static uplink symbol in a time domain duplexing pattern.

6. The UE of claim 1, wherein each physical downlink control channel monitoring occasion of the first set of one or more physical downlink control channel monitoring occasions is associated with a downlink control information format associated with feedback transmission.

7. The UE of claim 1, wherein the instructions are further executable by the one or more processors to:
transmit a capability report indicating a capability of the UE to use a first type of feedback codebook that has the first codebook size that corresponds to a quantity of physical downlink control channel monitoring occasions, wherein the first feedback is in accordance with the first type of feedback codebook; and
receive, based at least in part on transmitting the capability report, radio resource control signaling indicating a configuration for the first type of feedback codebook, wherein the configuration is associated with a cell group of the UE, a component carrier of the UE, or both.

8. The UE of claim 1, wherein the instructions are further executable by the one or more processors to:

receive control information indicating a first set of slot offset values and a second set of slot offset values, wherein the subset of the plurality of time slots is based at least in part on the first set of slot offset values and the second set of slot offset values.

9. The UE of claim 1, wherein the instructions are further executable by the one or more processors to:

receive an indication of a plurality of slot offset values, wherein the first set of one or more physical downlink control channel monitoring occasions within at least the subset of the plurality of time slots that occur before the second time slot is based at least in part on the plurality of slot offset values.

10. The UE of claim 9, wherein the instructions are further executable by the one or more processors to:

receive, during a first physical downlink control channel monitoring occasion of the first set of one or more physical downlink control channel monitoring occasions, a second downlink control information message that schedules a physical downlink control channel transmission and indicates a first slot offset value of the plurality of slot offset values, the first slot offset value indicating a quantity of time slots between a third time slot associated with the first physical downlink control channel monitoring occasion and the second time slot.

11. The UE of claim 1, wherein each entry of the first feedback comprises a quantity of bits corresponding to a quantity of codewords configured for data channel reception by the UE.

12. The UE of claim 11, wherein the quantity of bits is two bits comprising a first bit and a second bit, and wherein:

the first bit and the second bit each indicate negative acknowledgement based at least in part on not receiving control information during a corresponding physical downlink control channel monitoring occasion of the first set of one or more physical downlink control channel monitoring occasions; or the first bit indicates a decoding result of a first codeword and the second bit indicates a negative acknowledgement based at least in part on receiving a second downlink control information message during the corresponding physical downlink control channel monitoring occasion and the second downlink control information message scheduling a single codeword, the single codeword comprising the first codeword; or the first bit indicates an acknowledgement and second bit indicates an acknowledgement or a negative acknowledgement based at least in part on receiving the second downlink control information message during the corresponding physical downlink control channel monitoring occasion and the second downlink control information message not scheduling a data transmission.

13. The UE of claim 1, wherein each entry of the first feedback comprises a quantity of bits corresponding to a quantity of code block groups configured for data channel reception by the UE.

14. The UE of claim 13, wherein:

each bit of the quantity of bits indicates a negative acknowledgement based at least in part on not receiving control information during a corresponding physical downlink control channel monitoring occasion of the first set of one or more physical downlink control channel monitoring occasions; or a first subset of the quantity of bits indicates an acknowledgement or a negative acknowledgement and second subset of the quantity of bits indicates a negative acknowledgement based at least in part on receiving a second downlink control information message during the corresponding physical downlink control channel monitoring occasion and the second downlink control information message scheduling a second quantity of code block groups that is less than the quantity of code block groups configured for data channel reception by the UE; or a first bit of the quantity of bits indicates an acknowledgment and one or more remaining bits of the quantity of bits indicates an acknowledgement or a negative acknowledgement based at least in part on receiving the second downlink control information message during the corresponding physical downlink control channel monitoring occasion and the second downlink control information message not scheduling a data transmission.

15. A network entity for wireless communications, comprising:

one or more processors;

memory coupled with the one or more processors; and instructions stored in the memory and executable by the one or more processors to:

transmit, in a first time slot, a first downlink control information message indicating a second time slot for a user equipment (UE) to transmit feedback according to a codebook size; and receive first feedback according to a first codebook size in the second time slot based at least in part on the first downlink control information message, wherein the first codebook size of the first feedback is based at least in part on a first quantity of a first set of one or more physical downlink control channel monitoring occasions that occur within at least a subset of a plurality of time slots that occur before the second time slot, and wherein each entry of the first feedback corresponds to a respective physical downlink control channel monitoring occasion of the first set of one or more physical downlink control channel monitoring occasions.

16. The network entity of claim 15, wherein the instructions are further executable by the one or more processors to:

receive a capability report indicating a capability of the UE to use a first type of feedback codebook that has the first codebook size that corresponds to a quantity of physical downlink control channel monitoring occasions, wherein the first feedback is in accordance with the first type of feedback codebook; and transmit, based at least in part on receiving the capability report, radio resource control signaling indicating a configuration for the first type of feedback codebook, wherein the configuration is associated with a cell group of the UE, a component carrier of the UE, or both.

17. The network entity of claim 15, wherein the instructions are further executable by the one or more processors to:

transmit control information indicating a first set of slot offset values and a second set of slot offset values, wherein the subset of the plurality of time slots is based at least in part on the first set of slot offset values and the second set of slot offset values.

18. The network entity of claim 15, wherein the instructions are further executable by the one or more processors to:

transmit an indication of a plurality of slot offset values, wherein the first set of one or more physical downlink control channel monitoring occasions within at least the subset of the plurality of time slots that occur before the second time slot is based at least in part on the plurality of slot offset values.

19. The network entity of claim 18, wherein the instructions are further executable by the one or more processors to:

transmit, during a first physical downlink control channel monitoring occasion of the first set of one or more physical downlink control channel monitoring occasions, a second downlink control information message that schedules a physical downlink control channel transmission and indicates a first slot offset value of the plurality of slot offset values, the first slot offset value indicating a quantity of time slots between a third time slot associated with the first physical downlink control channel monitoring occasion and the second time slot.

20. A method for wireless communications at a user equipment (UE), comprising:

receiving, in a first time slot, a first downlink control information message indicating a second time slot for the UE to transmit feedback according to a codebook size;

monitoring a first set of one or more physical downlink control channel monitoring occasions within at least a subset of a plurality of time slots that occur before the second time slot based at least in part on the first downlink control information message; and transmitting first feedback according to a first codebook size in the second time slot in response to the first downlink control information message, wherein the first codebook size of the first feedback is based at least in part on a first quantity of the first set of one or more physical downlink control channel monitoring occasions that occur within at least the subset of the plurality of time slots, and wherein each entry of the first feedback corresponds to a respective physical downlink control channel monitoring occasion of the first set of one or more physical downlink control channel monitoring occasions.

21. A method for wireless communications at a network entity, comprising:

transmitting, in a first time slot, a first downlink control information message indicating a second time slot for a user equipment (UE) to transmit feedback according to a codebook size; and receiving first feedback according to a first codebook size in the second time slot based at least in part on the first downlink control information message, wherein the first codebook size of the first feedback is based at least in part on a first quantity of a first set of one or more physical downlink control channel monitoring occasions that occur within at least a subset of a plurality of time slots that occur before the second time slot, and wherein each entry of the first feedback corresponds to a respective physical downlink control channel monitoring occasion of the first set of one or more physical downlink control channel monitoring occasions.

* * * * *